US012572745B1

(12) United States Patent
Lee et al.

(10) Patent No.: US 12,572,745 B1
(45) Date of Patent: Mar. 10, 2026

(54) SUFFIX-BASED SPECULATIVE TOKEN DECODING FOR ARTIFICIAL INTELLIGENCE MODEL

(71) Applicant: Snowflake Inc., Bozeman, MT (US)

(72) Inventors: Jaeseong Lee, Seoul (KR); Gabriele Oliaro, Pittsburgh, PA (US); Aurick Qiao, Pittsburgh, PA (US); Samyam Rajbhandari, Sammamish, WA (US); Ye Wang, San Jose, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 19/305,085

(22) Filed: Aug. 20, 2025

(51) Int. Cl.
*G06F 40/284* (2020.01)
*G06F 16/901* (2019.01)

(52) U.S. Cl.
CPC ........ *G06F 40/284* (2020.01); *G06F 16/9027* (2019.01)

(58) Field of Classification Search
CPC ............................ G06F 16/9027; G06F 40/284
See application file for complete search history.

(56) References Cited

U.S. PATENT DOCUMENTS

| | | | |
|---|---|---|---|
| 2024/0320433 A1* | 9/2024 | Lott ...................... | G06F 40/284 |
| 2025/0021761 A1* | 1/2025 | Santhanam ........... | G06F 40/284 |
| 2025/0094709 A1* | 3/2025 | Tuli ...................... | G06F 40/284 |
| 2025/0209271 A1* | 6/2025 | Imanigooghari ....... | G06F 40/40 |

OTHER PUBLICATIONS

F. Chen, P. Li, T. H. Luan, Z. Su and J. Deng, "SPIN: Accelerating Large Language Model Inference with Heterogeneous Speculative Models,", 2025, IEEE Infocom 2025—IEEE Conference on Computer Communications, London, United Kingdom, pp. 1-10 (Year: 2025).*

Hyun Ryu, Eric Kim, "Closer Look at Efficient Inference Methods: A Survey of Speculative Decoding", 2024, https://arxiv.org/abs/2411.13157 (Year: 2024).*

Jun Zhang, Jue Wang, Huan Li, Lidan Shou, Ke Chen, Gang Chen, Sharad Mehrotra, "Draft & Verify: Lossless Large Language Model Acceleration via Self-Speculative Decoding", 2024, https://arxiv.org/abs/2309.08168 (Year: 2024).*

(Continued)

*Primary Examiner* — Eric Yen

(74) *Attorney, Agent, or Firm* — Schwegman Lundberg & Woessner, P.A.

(57) ABSTRACT

Various example embodiments described herein provide for systems, methods, devices, instructions, and the like for suffix-based speculative token decoding for an artificial intelligence model, such as a language model (e.g., large language model). In particular, some example embodiments provide an AI model system with hybrid speculative token decoding, which combines suffix-based speculative token decoding with a draft AI model approach to speculative token decoding. With this hybrid decoding approach, various example embodiments can accelerate inference throughput while adapting to different types of workloads, particularly agentic applications that exhibit repetitive token generation patterns.

30 Claims, 8 Drawing Sheets

(56)         References Cited

OTHER PUBLICATIONS

Z. Gao, L. Han, C. Kong, W. Gao, J. Xie and J. Liang, "Dynamic K Mechanism for Accelerating Speculative Decoding in vLLM,", 2025, 2025 6th International Conference on Electronic Communication and Artificial Intelligence (ICECAI), Chengdu, China, pp. 785-790 (Year: 2025).*

Gabriele Oliaro, Zhihao Jia, Daniel Campos, Aurick Qiao, "SuffixDecoding: Extreme Speculative Decoding for Emerging AI Applications", Jun. 2, 2025, https://arxiv.org/abs/2411.04975v2 (Year: 2025).*

Yunhai Hu, Zining Liu, Zhenyuan Dong, Tianfan Peng, Bradley McDanel, Sai Qian Zhang, "Speculative Decoding and Beyond: An In-Depth Survey of Techniques", Mar. 4, 2025, https://arxiv.org/abs/2502.19732v3 (Year: 2025).*

Deng, Minghang, "ReFORCE A Text to SQL Agent with Self Refinement Consensus Enforcement and Column Exploration", arXiv2502.00675, Jun. 3, 2025, 33 pages.

He, Yexiao, "MedOrch Medical Diagnosis with Tool Augmented Reasoning Agents for Flexible Extensibility", arXiv2506.00235, May 30, 2025, 21 pages.

Oliaro, Gabriele, "SuffixDecoding Extreme Speculative Decoding for Emerging AI Applications", arXiv2411.04975v3 [cs.CL], Oct. 7, 2025, 22 pgs.

Rajbhandari, Samyam, "Arctic Inference with Shift Parallelism The Fastest Open Source Inference System for Enterprise AI", [Online]. Retrieved from the Internet https www.snowflake.com en engineering-blog arctic-inference-shift-parallelism, May 29, 2025, 26 pages.

Trulens, "Evaluate and Trace AI Agents", [Online]. Retrieved from the Internet https www.trulens.org , 9 pages.

Wang, Ye, "Fastest Speculative Decoding in vLLM with Arctic Inference and Arctic Training", [Online]. Retrieved from the Internet URL https www.snowflake.com en engineering-blog fast-speculative-decoding-vllm-arctic , May 1, 2025, 32 pages.

Wu, Ruofan, "ComposeRAG A Modular and Composable RAG for Corpus Grounded Multi Hop Question Answering", arXiv2506.00232, May 30, 2025, 31 pages.

Yu, Puxuan, "Evaluating Multimodal vs Text Based Retrieval for RAG with Snowflake Cortex", [Online]. Retrieved from the Internet https www.snowflake.com en engineering-blog arctic-agentic-rag-multimodal-pdf-retrieval , Apr. 21, 2025, 16 pages.

Zayats, Tom, "Agentic Semantic Model Improvement Elevating Text to SQL Performance", [Online]. Retrieved from the Internet https www.snowflake.com en engineering-blog agentic-semantic-model-text-to-sql , Mar. 31, 2025, 22 pages.

* cited by examiner

SUFFIX-BASED SPECULATIVE TOKEN DECODING FOR ARTIFICIAL INTELLIGENCE MODEL

TECHNICAL FIELD

Embodiments described herein relate to data systems and, more particularly, to systems, methods, devices, and instructions for suffix-based speculative token decoding for an artificial intelligence model, such as a language model (e.g., large language model).

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

In a typical implementation, a data platform includes one or more databases that are maintained on behalf of a customer account. Indeed, the data platform may include one or more databases that are respectively maintained in association with any number of customer accounts, as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata in association with the data platform in general and in association with, as examples, particular databases and/or particular customer accounts as well.

Users and/or executing processes that are associated with a given customer account may, via one or more types of clients, be able to cause data to be ingested into the database, and may also be able to manipulate the data, add additional data, remove data, run queries against the data, generate views of the data, and so forth.

When certain information is to be extracted from a database, a query statement may be executed against the database data. A data platform may process the query and return certain data according to one or more query predicates that indicate what information should be returned by the query. The data platform extracts specific data from the database and formats that data into a readable form. However, it can be challenging to execute queries on a very large table because a significant amount of time and computing resources are required to scan an entire table to identify data that satisfies the query.

BRIEF DESCRIPTION OF THE DRAWINGS

Various ones of the appended drawings merely illustrate various example embodiments of the present disclosure and should not be considered as limiting its scope. In the drawings, which are not necessarily drawn to scale, like numerals may describe similar components in different views. To easily identify the discussion of any particular element or act, the most significant digit or digits in a reference number refer to the figure number in which that element is first introduced.

DETAILED DESCRIPTION

Figure 1:
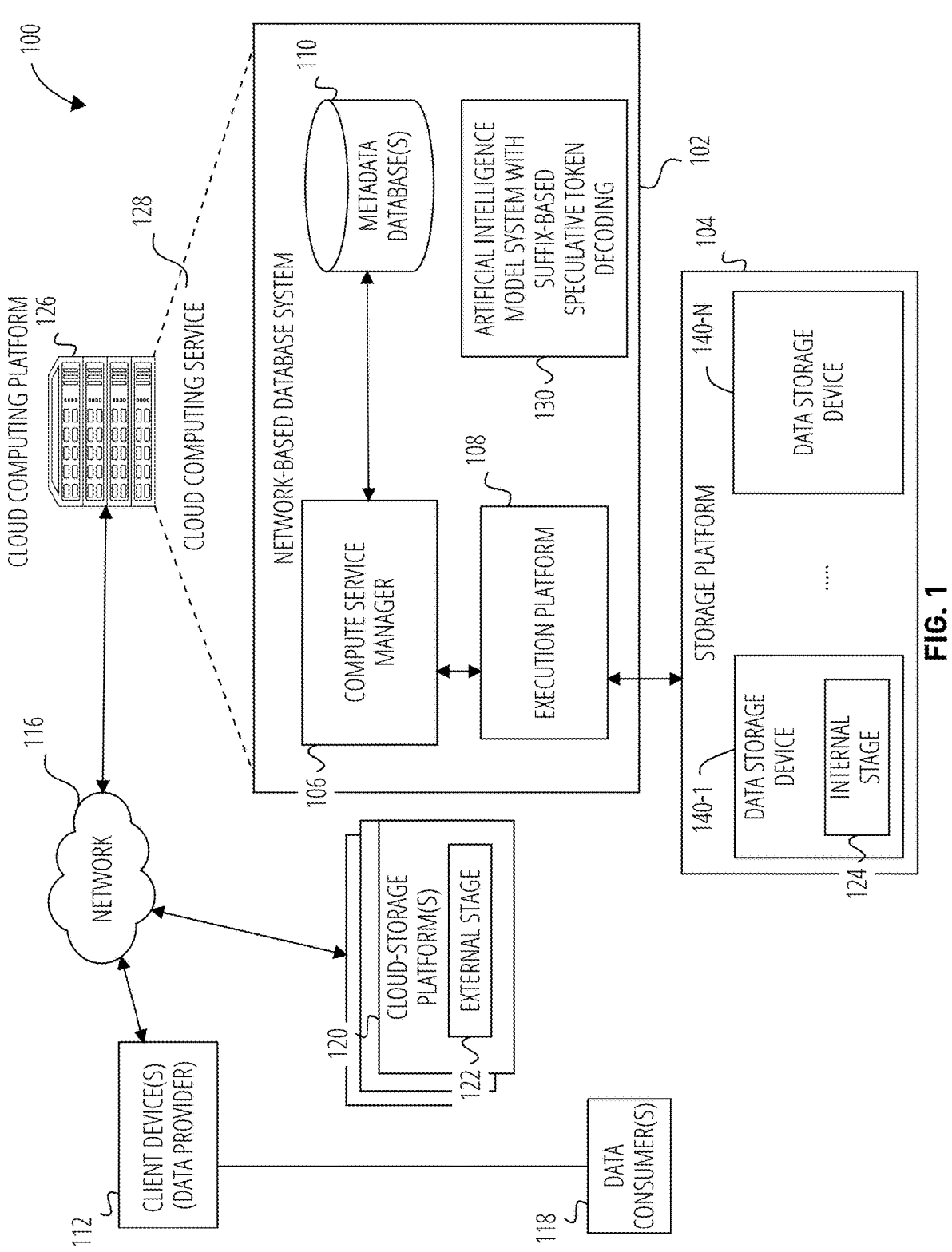
FIG. 1 illustrates an example computing environment comprising a database system in the example form of a network-based database system that includes an artificial intelligence model system with suffix-based speculative token decoding, according to some example embodiments of the present disclosure.

Reference will now be made in detail to specific embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Large language models (LLMs) have become foundational components in data platforms and artificial intelligence (AI) systems, enabling applications ranging from automated coding assistants to multi-agent workflows and retrieval-based search systems. These models process input prompts in parallel during a prefill stage, then sequentially generate new tokens during a decode stage, with each token conditioned on previously generated tokens.

The sequential nature of token generation creates inherent bottlenecks in inference throughput, as each token requires a separate forward pass through an AI model, such as an LLM. This sequentiality limits the ability to fully utilize parallel hardware accelerators such as graphics processing units (GPUs) or tensor processing units (TPUs), particularly as AI model sizes continue to grow and their computational requirements increase.

Speculative decoding techniques have emerged as a strategy to accelerate inference using an AI model by generating multiple candidate tokens using a draft AI model (e.g., draft language model), which can then be verified in parallel by a primary AI model (e.g., primary language model). The basic method can comprise: (1) Speculation operation: using a draft AI model (e.g., draft LLM) to rapidly produce one or more speculative tokens (e.g., 3 to 5 tokens) $x_{spec} = (x_{t+1}, \ldots, x_{t+n})$ based on the existing token prefix $x_{<t}$; and (2) Verification operation: using a primary AI model (e.g., primary LLM) to verify (e.g., evaluates) the one or more speculative tokens in parallel (e.g., within a single computational forward pass), and accepting tokens up to a first discrepancy and discarding the rest of the tokens. The draft AI model can serve as a proposer, and the primary AI model can serve as a base AI model or verifier. The acceptance rate of the verification operation (e.g., average number or percentage of speculative tokens [from the draft AI model] validated and accepted during the verification operation) during each decoding step can serve as a metric to measure how effective the speculative decoding process is. A high acceptance rate can signify that the draft AI model is adept at predicting the output of the primary AI model, which can result in an enhanced speedup. A low acceptance rate can signify that the speculation tokens of the draft AI model are frequently incorrect, which can result in inefficiencies in the decoding process.

As used herein, a draft AI model comprises (a) a smaller version of a primary AI model (e.g., primary LLM) having one or more reduced parameters or computational requirements compared to the primary AI model, or comprises (b) one or more additional prediction layers attached to the primary AI model, where the additional prediction layers can include one or more Multi-Layer Perceptron (MLP) layers or Long Short-Term Memory (LSTM) layers, which can be configured to generate speculative token predictions based on hidden states from the primary AI model. Generally, the draft AI model can be trained through one or more distillation procedures to mimic outputs of the primary AI model without requiring training of one or more base model parameters. In this way, a draft AI model can be enabled to generate multiple candidate tokens with minimal computational overhead for parallel verification by a primary AI model, thereby accelerating inference throughput while preserving output distribution.

While speculative decoding techniques can accelerate inference using an AI model, existing approaches to speculative decoding face limitations in efficiently handling the computational overhead of draft AI model execution and in adapting speculation strategies based on the likelihood of token acceptance. For example, agentic applications, such as automated coding assistants, multi-agent workflows, and retrieval-based search systems, usually involve using LLMs to perform autonomous, goal-directed tasks through structured workflows and decision-making processes. Agentic applications typically submit repetitive inference requests through multi-agent pipelines, self-refinement loops, and similar subtasks, which can result in long and highly predictable token sequences that differ from the diverse, independent requests typically seen in conversational AI applications that use LLMs. Traditional speculative decoding fails to fully exploit the repetitive generation patterns present in agentic applications because the traditional speculative decoding only predicts a small number of tokens in advance even when there are many obvious repeated tokens.

Further, traditional speculative decoding lacks a simple and standardized framework for training custom draft AI models and bringing them seamlessly to production-serving, which is necessary for speculating non-repetitive generation patterns common in open-ended conversations. Additionally, system-level overheads usually prevent draft AI models from achieving their theoretical peak speedups. Various example embodiments described herein provide for systems, methods, devices, instructions, and the like for suffix-based speculative token decoding for an AI model, such as a language model (e.g., large language model). In particular, some example embodiments provide an AI model system with hybrid speculative token decoding, which combines suffix-based speculative token decoding (e.g., which uses token pattern matching) with a draft AI model approach to speculative token decoding. With this hybrid decoding approach, various example embodiments can accelerate inference throughput while adapting to different types of workloads, particularly agentic applications that exhibit repetitive token generation patterns. According to various example embodiments, the hybrid speculative token decoding (described herein) serves as the proposer, while the primary AI model remains the verifier.

According to some example embodiments, the AI model system processes inference requests through a set (e.g., series) of decoding iterations, where during each iteration, the AI model system first searches a suffix data structure (e.g., comprising one or more suffix tree data structures) for pattern matches between recently generated output tokens (e.g., a token pattern sequence or suffix, which can comprise a certain number of the last output tokens added to a final sequence of tokens) and previously observed output token sequences stored from historical requests. When a pattern match is found, the AI model system can determine a sequence of speculative tokens based on the match and can calculate a confidence score that estimates the likelihood that the speculative tokens are correctly speculated. For example, the score (e.g., given to a candidate sequence) can comprise an empirical estimate of the number of tokens that would be accepted according to historical patterns. If the confidence score satisfies a threshold condition, the AI model system can use a primary AI model (e.g., primary language model) to verify the speculative tokens in parallel, and if successfully verified, can add the speculative tokens to the sequence of recently generated output tokens.

For cases where suffix-based pattern matching is insufficient (e.g., when no suitable pattern match is found or confidence scores are too low), the AI model system of some example embodiments comprises a fallback mechanism that uses a draft AI model (e.g., draft language model) to generate speculative tokens. The draft AI model can comprise either a smaller version of the primary AI model or additional prediction layers (such as Multi-Layer Perceptron or Long Short-Term Memory layers) attached to the primary AI model (e.g., attached to one or more hidden layers of the primary AI model), which are trained (e.g., through distillation procedures) to mimic the outputs of the primary AI model. Eventually, when the set (e.g., series) of decoding iterations ends (e.g., based on a condition, such as maximum token length or the end of the sequence of input tokens being reached), the sequence of recently generated output tokens can be output as a (final) sequence of output tokens.

The suffix data structure can comprise one or more suffix tree data structures that efficiently store and enable rapid lookup of previously observed output token sequences. In particular, a given suffix tree data structure can cache (e.g., long) output token sequences previously generated (e.g., for previous prompts). Each node of the given suffix tree data structure can represent a token that is a possible continuation (e.g., next speculative token) from a last node, and paths from the root node can encode previously observed input token subsequences. Such a structure can enable rapid pattern matching, where for a current sequence of input tokens and a sequence of recently generated output tokens, the given suffix tree data structure can be used to identify one or more possible token continuations (e.g., output token sequences) based on prior occurrences and generate a sequence of speculative tokens based on those one or more possible token continuations. In some embodiments, the AI model system maintains separate suffix tree data structures, including a first suffix tree data structure (e.g., global suffix tree data structure) for previously generated output and a second suffix tree data structure (e.g., per-request suffix tree data structure) for a current ongoing inference request. When multiple suffix tree data structures contain pattern matches, the AI model system can determine a candidate sub-tree (e.g., candidate speculation tree) for each of the suffix tree data structures, can select the candidate sub-tree with the highest confidence score (e.g., frequency-based score), and can use the selected candidate sub-tree to determine the sequence of speculative tokens (e.g., which can be subsequently verified using a primary AI model).

For some example embodiments, the suffix-based speculative token decoding adaptively speculates more tokens when the likelihood of acceptance is high (and fewer when it is low), thereby effectively exploiting opportunities for longer speculations while conserving computation when those opportunities are limited. For example, at each inference step, the suffix-based speculative token decoding can adaptively limit its number of speculative tokens it determines (e.g., generates) based on the length of the pattern match (e.g., between the suffix and previously observed output token stored in a suffix data structure), and can use frequency-based statistics captured within a suffix data structure to score and select the "best" sequence of speculative tokens. As a result, longer pattern matches can enable confident speculation of longer speculative token sequences, thereby maximizing the effectiveness of the suffix-based speculative token decoding on agentic workloads, while shorter pattern matches can trigger conservative token speculation (e.g., using a draft AI model) to avoid computational waste.

Some example embodiments provide a technical solution that addresses the limitations of existing speculative decoding approaches by intelligently combining suffix-based speculative token decoding (which can help accelerate repetitive, agentic workloads) with draft AI model speculative token decoding (which can handle diverse, conversational workloads). In doing so, various example embodiments can achieve improved inference throughput across mixed workloads. The hybrid approach of various example embodiments enables an AI model system to dynamically select (e.g., at runtime) the most appropriate speculation strategy based on the characteristics of each inference request, which can result in enhanced speedup compared to using either technique individually. Accordingly, various example embodiments described herein can address the specific challenges faced by agentic applications (such as automated coding assistants, multi-agent workflows, and retrieval-based search systems) that involve repetitive inference requests that can benefit significantly from pattern-based speculation, while still maintaining effectiveness for more diverse token generation tasks. Overall, various example embodiments combine multiple approaches to accelerate token generation while maintaining output quality.

As used herein, a language model can comprise an LLM, which can include, without limitation, a GPT model, a LLAMA model, a MISTRAL model, a Claude model, or another type of large language model (e.g., a proprietary or tailored, generative pre-trained transformer). Generally, an LLM can be constructed using deep learning techniques, such as neural networks, and trained to understand, predict, and generate output data (e.g., text, an image, an audio or a video) by learning patterns, semantics, syntax, and contextual meanings from input data (e.g., text, an image, an audio or a video). With respect to text, an LLM can operate by processing sequences of text and can perform various tasks, such as text completion, translation, summarization, question answering, and dialogue generation, with the ability to generalize across languages and domains based on the scale of training data. As used herein, a foundation model (e.g., foundation LLM) can comprise a large-scale AI model trained on broad and diverse datasets that can be adapted to a wide range of downstream tasks, often through fine-tuning or prompt engineering. Whereas a foundation model can provide general-purpose capabilities that can serve as a base for multiple specialized applications across modalities or domains, a non-foundation model, such as a task-specific model (e.g., task-specific LLM), can comprise an AI model trained or optimized for a narrow, well-defined function.

As used herein, a language model inference (e.g., LLM inference) processing by a language model (e.g., LLM) can comprise two stages: given a prompt comprising an input sequence of tokens $x_{prompt}=(x_1, x_2, \ldots, x_m)$, a language model first processes the prompt (e.g., multiple tokens of the prompt) in parallel during a first stage (e.g., prefill stage), then sequentially generates new tokens during a second stage (e.g., decode stage), with each token $x_{t>m}$ conditioned on previously generated tokens, which can by $x_{t+1}=Sample$ $(x|x_{1, \ldots, t})$. Generally, after the first stage completes (e.g., once multiple tokens of the prompt have been processed in parallel), the second stage comprises one or more decoding iterations, where each decoding iteration comprises generating an individual token (that becomes part of an output sequence of tokens) based on a sampling of one or more previously tokens. The decoding iterations can be performed until a stop condition is reached (e.g., end-of-text token or maximum length is reached). The language model inference processing can comprise greedy sampling, where the highest-probability token from a language model's predicted distribution is selected iteratively until a stopping condition, such as reaching an end-of-text token or maximum length. Since each token depends on preceding outputs during a language model inference process, token generation can be inherently sequential and can involve a separate forward pass per generated token. This can sequentially limit language model inference throughput and can underutilize parallel hardware processors (e.g., hardware accelerators), such as GPUs or TPUs.

As used herein, an agentic (or agentic AI) application or algorithm can comprise a software application or algorithm that structures complex tasks as sequences or compositions of AI model calls (e.g., LLM calls) to issue multiple inference requests per task. Generally, inference calls (e.g., LLM inference calls) by agentic application/algorithms tend to generate long and repetitive token sub-sequences due to the structure of agentic application/algorithms. For example, an agentic application/algorithm can comprise self-consistency that samples multiple reasoning paths in parallel before selecting a final answer based on consensus. While each path can be independently sampled, they all start can from the same prompt and often share similar reasoning steps or chain-of-thought sequences. An agentic application/algorithm can comprise self-refinement (e.g., commonly used in coding agents) that improves initial outputs by iteratively identifying and fixing errors. Each iteration can revise only a small portion of the text—such as a few lines of code—while preserving the majority of the surrounding content. An agentic application/algorithm can multi-agent workflows that decompose tasks into modular subtasks performed by specialized agents (e.g., retrieval, reasoning, synthesis). Because each AI agent (or agent) of an agentic application/algorithm can handle a narrowly scoped function, the outputs of the agents can exhibit highly repetitive structures. Such patterns of agentic applications/algorithms can result in a high degree of redundancy (e.g., long repeated token sequences) across AI model calls (e.g., LLM calls), where various example embodiments described herein can exploit for greater acceleration.

While various example embodiments are described herein with respect to language models, it will be understood that one or more example embodiments described herein can be modified or expanded to be used with other types of AI models (e.g., non-language generative models).

Additionally, traditional speculative decoding approaches usually lack standardized training frameworks and optimized inference pipelines that can achieve theoretical peak speedups. In some instances, the absence of accessible training tools and recipes has slowed the adoption of draft model approaches, particularly for open-ended conversational settings with less repetitive patterns. Accordingly, various example embodiments address these limitations by providing standardized training frameworks and comprehensive system-level optimizations that reduce computational overhead while maintaining output quality.

In particular, some example embodiments provide an AI model system that comprises a standardized training framework for draft AI models that provides accessible training recipes for speculative decoding. For various example embodiments, the training framework comprises bundled configurations that comprise one or more of data sets, hyperparameters, or model architectures in standardized format files, which can simplify reproducibility and result sharing for draft model training.

In some example embodiments, the training framework supports arbitrary draft model architectures, such as Multi-Layer Perceptron (MLP) and Long Short-Term Memory (LSTM) based designs, which can provide optimal balance between acceptance rate and inference latency optimization. For some example embodiments, MLP-based draft models (e.g., speculators) comprise simple feed-forward models that use language model final hidden states and last token identifiers, functioning similarly to recurrent neural networks by passing hidden states between processing steps.

Various example embodiments comprise LSTM-based draft models (e.g., speculators) that extend MLP model functionality with standard LSTM gates, which can include one or more of forget gates, input gates, output gates, or cell states. For some example embodiments, LSTM-based draft models provide improved efficiency by achieving higher acceptance rates with fewer parameters compared to MLP-based approaches.

According to some example embodiments, the training framework employs single-stage training on synthetic data generated using one or more conversational prompts over extended training horizons (rather than traditional two-stage training approaches). For various example embodiments, this single-stage approach achieves significantly higher acceptance rates compared to existing approaches while maintaining training efficiency.

Reference will now be made in detail to various example embodiments of the present disclosure, examples of which are illustrated in the appended drawings. The present disclosure may, however, be embodied in many different forms and should not be construed as being limited to the examples set forth herein.

FIG. 1 illustrates an example computing environment 100 comprising a database system in the example form of a network-based database system 102 that includes an AI model system 130 with suffix-based speculative token decoding, according to some example embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other example embodiments, the computing environment may comprise another type of network-based database system or a cloud data platform. For example, in some example embodiments, the computing environment 100 may include a cloud computing platform 126 with the network-based database system 102, and a storage platform 104 (also referred to as a cloud storage platform). The cloud computing platform 126 provides computing resources and storage resources that may be acquired (purchased) or leased and configured to execute applications and store data.

The cloud computing platform 126 may host a cloud computing service 128 that facilitates storage of data on the cloud computing platform 126 (e.g., data management and access) and analysis functions (e.g., SQL queries, analysis), as well as other processing capabilities (e.g., configuring replication group objects as described herein). The cloud computing platform 126 may include a three-tier architecture: data storage (e.g., storage platforms 104), an execution platform 108 (e.g., providing query processing), and a compute service manager 106 providing cloud services.

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 126 could also use a cloud-storage platform as what is referred to herein as an internal storage location concerning the data platform.

From the perspective of the network-based database system 102 of the cloud computing platform 126, one or more files that are stored at one or more storage locations are referred to herein as being organized into one or more of what is referred to herein as either "internal stages" or "external stages." Internal stages (e.g., internal stage 124) are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 126 is in communication with the storage platforms 104 and cloud-storage platforms 120 (e.g., AWS®, Microsoft Azure Blob Storage®, or Google Cloud Storage). The network-based database system 102 is a network-based system used for reporting and analysis of integrated data from one or more disparate sources including one or more storage locations within the storage platform 104. The storage platform 104 comprises a plurality of computing machines and provides on-demand computer system resources such as data storage and computing power to the network-based database system 102.

The network-based database system 102 comprises a compute service manager 106, an execution platform 108, and one or more metadata databases 110. The network-based database system 102 hosts and provides data reporting and analysis services to multiple client accounts.

The compute service manager 106 coordinates and manages operations of the network-based database system 102. The compute service manager 106 also performs query optimization and compilation as well as managing clusters of computing services that provide compute resources (also referred to as "virtual warehouses"). The compute service manager 106 can support any number of client accounts such as end-users providing data storage and retrieval requests, system administrators managing the systems and methods described herein, and other components/devices that interact with compute service manager 106.

The compute service manager 106 is also in communication with a client device 112. The client device 112 corresponds to a user of one of the multiple client accounts supported by the network-based database system 102. A user may utilize the client device 112 to submit data storage, retrieval, and analysis requests to the compute service manager 106. Client device 112 (also referred to as remote computing device or user client device 112) may include one or more of a laptop computer, a desktop computer, a mobile phone (e.g., a smartphone), a tablet computer, a cloud-hosted computer, cloud-hosted serverless processes, or other computing processes or devices may be used (e.g., by a data provider) to access services provided by the cloud computing platform 126 (e.g., cloud computing service 128) by way of a network 116, such as the Internet or a private network. A data consumer 118 can use another computing device to access the data of the data provider (e.g., data obtained via the client device 112).

In the description below, actions are ascribed to users, particularly consumers and providers. Such actions shall be understood to be performed concerning client device (or devices) 112 operated by such users. For example, a notification to a user may be understood to be a notification transmitted to the client device 112, input or instruction from a user may be understood to be received by way of the client device 112, and interaction with an interface by a user shall be understood to be interaction with the interface on the client device 112. In addition, database operations (joining, aggregating, analysis, etc.) ascribed to a user (consumer or provider) shall be understood to include performing such actions by the cloud computing service 128 in response to an instruction from that user.

The compute service manager 106 is also coupled to one or more metadata databases 110 that store metadata about various functions and aspects associated with the network-based database system 102 and its users. For example, a metadata database 110 may include a summary of data stored in remote data storage systems as well as data available from a local cache. Additionally, a metadata database 110 may include information regarding how data is organized in remote data storage systems (e.g., the cloud storage platform 104) and the local caches. Information stored by a metadata database 110 allows systems and services to determine whether a piece of data needs to be accessed without loading or accessing the actual data from a storage device. In some example embodiments, metadata database 110 is configured to store account object metadata (e.g., account objects used in connection with a replication group object).

Figure 3:
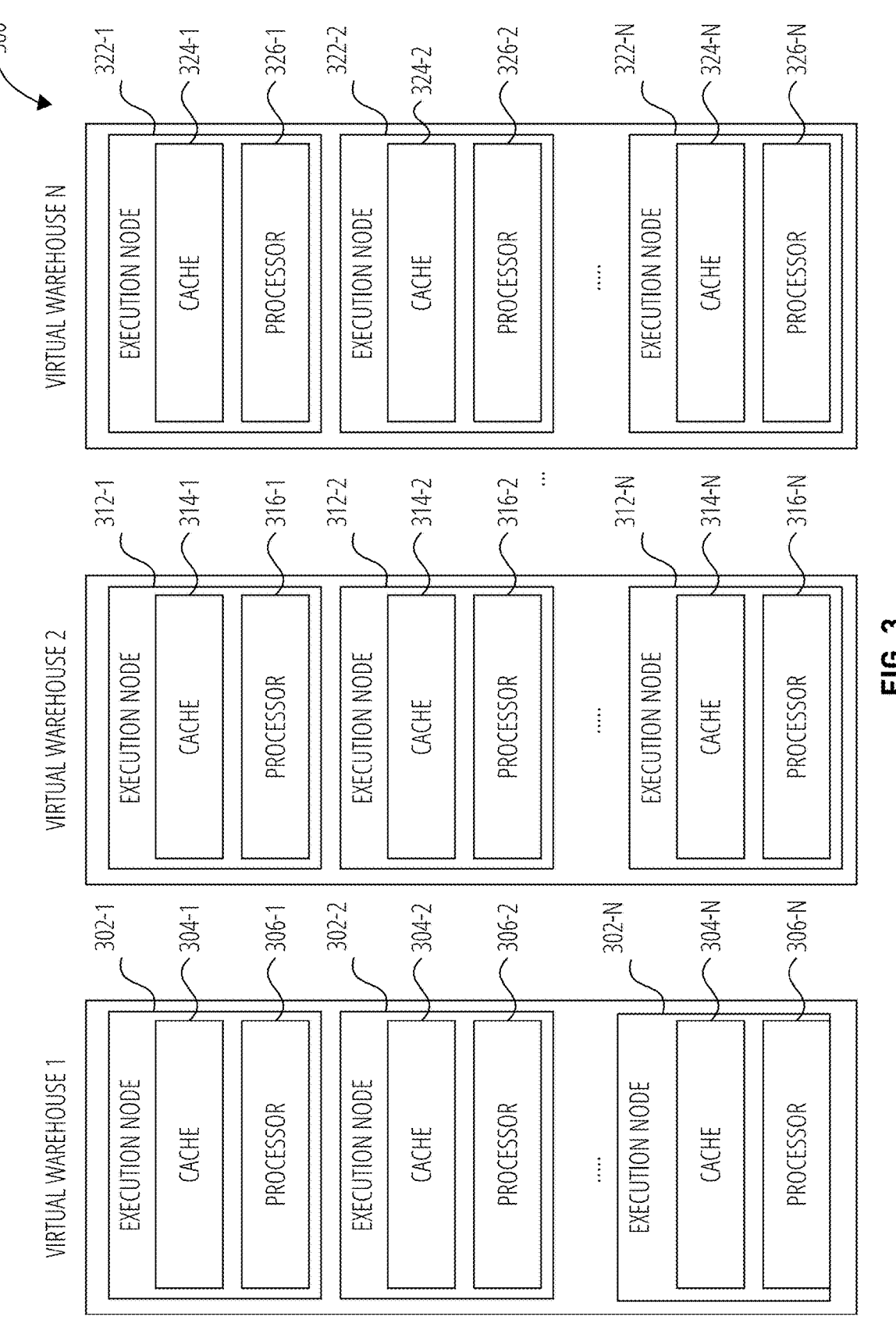
FIG. 3 is a block diagram illustrating components of an execution platform, according to some example embodiments of the present disclosure.

The compute service manager 106 is further coupled to the execution platform 108, which provides multiple computing resources that execute various data storage and data retrieval tasks. As illustrated in FIG. 3, the execution platform 108 comprises a plurality of compute nodes. The execution platform 108 is coupled to storage platform 104 and cloud-storage platforms 120. The storage platform 104 comprises multiple data storage devices 140-1 to 140-N. In some example embodiments, the data storage devices 140-1 to 140-N are cloud-based storage devices located in one or more geographic locations. For example, the data storage devices 140-1 to 140-N may be part of a public cloud infrastructure or a private cloud infrastructure. The data storage devices 140-1 to 140-N may be hard disk drives (HDDs), solid-state drives (SSDs), storage clusters, Amazon S3™ storage systems, or any other data-storage technology. Additionally, the cloud storage platform 104 may include distributed file systems (such as Hadoop Distributed File Systems (HDFS)), object storage systems, and the like. In some example embodiments, at least one internal stage 124 may reside on one or more of the data storage devices 140-1-140-N, and at least one external stage 122 may reside on one or more of the cloud-storage platforms 120.

In some example embodiments, communication links between elements of the computing environment 100 are implemented via one or more data communication networks. These data communication networks may utilize any communication protocol and any type of communication medium. In some example embodiments, the data communication networks are a combination of two or more data communication networks (or sub-networks) coupled to one another. In alternative embodiments, these communication links are implemented using any type of communication medium and any communication protocol.

The compute service manager 106, metadata database(s) 110, execution platform 108, and storage platform 104, are shown in FIG. 1 as individual discrete components. However, each of the compute service manager 106, metadata database(s) 110, execution platform 108, and storage platform 104 may be implemented as a distributed system (e.g., distributed across multiple systems/platforms at multiple geographic locations). Additionally, each of the compute service manager 106, metadata database(s) 110, execution platform 108, and storage platform 104 can be scaled up or down (independently of one another) depending on changes to the requests received and the changing needs of the network-based database system 102. Thus, in the described example embodiments, the network-based database system 102 is dynamic and supports regular changes to meet the current data processing needs.

During a typical operation, the network-based database system 102 processes multiple jobs determined by the compute service manager 106. These jobs are scheduled and managed by the compute service manager 106 to determine when and how to execute the job. For example, the compute service manager 106 may divide the job into multiple discrete tasks and may determine what data is needed to execute each of the multiple discrete tasks. The compute service manager 106 may assign each of the multiple discrete tasks to one or more nodes of the execution platform 108 to process the task. The compute service manager 106 may determine what data is needed to process a task and further determine which nodes within the execution platform 108 are best suited to process the task. Some nodes may have already cached the data needed to process the task and, therefore, be a good candidate for processing the task. Metadata stored in a metadata database 110 assists the compute service manager 106 in determining which nodes in the execution platform 108 have already cached at least a portion of the data needed to process the task. One or more nodes in the execution platform 108 process the task using data cached by the nodes and, if necessary, data retrieved from the storage platform 104. It is desirable to retrieve as much data as possible from caches within the execution platform 108 because the retrieval speed is typically much faster than retrieving data from the storage platform 104.

As shown in FIG. 1, the cloud computing platform 126 of the computing environment 100 separates the execution platform 108 from the storage platform 104. In this arrangement, the processing resources and cache resources in the execution platform 108 operate independently of the data storage devices 140-1 to 140-N in the storage platform 104. Thus, the computing resources and cache resources are not restricted to specific data storage devices 140-1 to 140-N. Instead, all computing resources and all cache resources may retrieve data from, and store data to, any of the data storage resources in the storage platform 104.

As also shown, the network-based database system 102 comprises the AI model system 130 with suffix-based speculative token decoding, which can perform suffix-based speculative token decoding for an AI model in accordance with various example embodiments described herein. With the AI model system 130, the network-based database system 102 can suffix-based speculative token decoding for an AI model with respect to a data request (e.g., structured data query) that uses the AI model (e.g., language model) for processing at least some portion of the data request.

Figure 2:
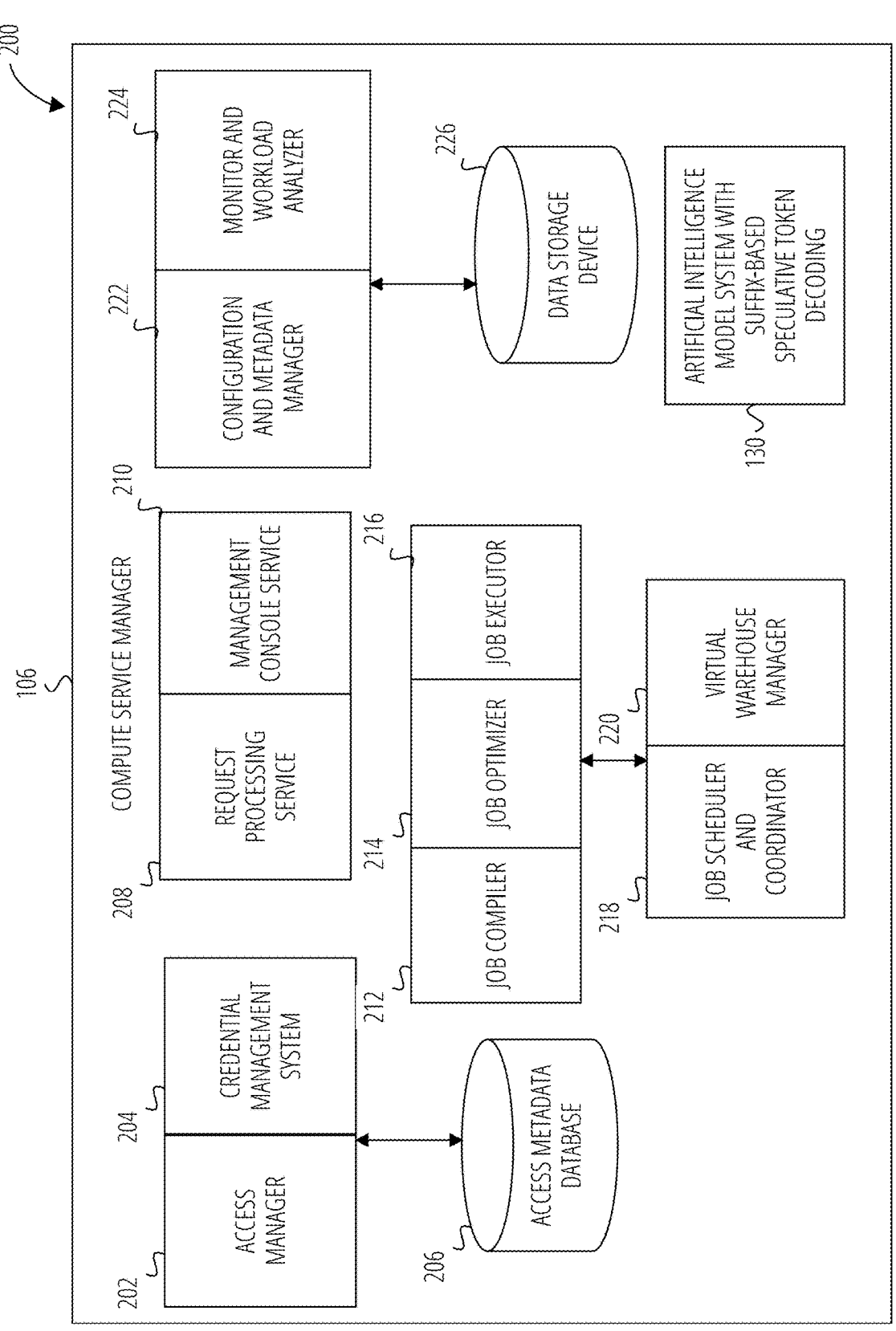
FIG. 2 is a block diagram illustrating components of a compute service manager, according to some example embodiments of the present disclosure.

FIG. 2 is a block diagram 200 illustrating components of the compute service manager 106, according to some example embodiments of the present disclosure. As shown in FIG. 2, the compute service manager 106 includes an access manager 202 and a credential management system 204 coupled to access metadata database 206, which is an example of the metadata database(s) 110.

Access manager 202 handles authentication and authorization tasks for the systems described herein. The credential management system 204 facilitates use of remote stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data can be stored in a cache within the execution platform 108 or in a data storage device in storage platform 104.

A management console service 210 supports access to various systems and processes by administrators and other system managers. Additionally, the management console service 210 may receive a request to execute a job and monitor the workload on the system.

The compute service manager 106 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 106.

A job scheduler and coordinator 218 sends received jobs to the appropriate services or systems for compilation, optimization, and dispatch to the execution platform 108. For example, jobs can be prioritized and then processed in that prioritized order. In an embodiment, the job scheduler and coordinator 218 determines a priority for internal jobs that are scheduled by the compute service manager 106 with other "outside" jobs such as user queries that can be scheduled by other systems in the database but may utilize the same processing resources in the execution platform 108. In some example embodiments, the job scheduler and coordinator 218 identifies or assigns particular nodes in the execution platform 108 to process particular tasks. A virtual warehouse manager 220 manages the operation of multiple virtual warehouses implemented in the execution platform 108. For example, the virtual warehouse manager 220 may generate query plans for executing received queries.

Additionally, the compute service manager 106 includes a configuration and metadata manager 222, which manages the information related to the data stored in the remote data storage devices and in the local buffers (e.g., the buffers in execution platform 108). The configuration and metadata manager 222 uses metadata to determine which data files need to be accessed to retrieve data for processing a particular task or job. A monitor and workload analyzer 224 oversees processes performed by the compute service manager 106 and manages the distribution of tasks (e.g., workload) across the virtual warehouses and execution nodes in the execution platform 108. The monitor and workload analyzer 224 also redistributes tasks, as needed, based on changing workloads throughout the cloud computing platform 126 and may further redistribute tasks based on a user (e.g., "external") query workload that may also be processed by the execution platform 108. The configuration and metadata manager 222 and the monitor and workload analyzer 224 are coupled to a data storage device 226. Data storage device 226 in FIG. 2 represents any data storage device within the storage platform 104. For example, data storage device 226 may represent buffers in execution platform 108, storage devices in cloud storage platform 104, or any other storage device.

As described in embodiments herein, the compute service manager 106 validates all communication from an execution platform (e.g., the execution platform 108) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1) may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query, and any other data is unusable, rendered so by destruction or encryption where the key is unavailable.

As shown, the compute service manager 106 includes the AI model system 130, which can enable the compute service manager 106 to implement one or more features for performing suffix-based speculative token decoding for an AI model on the network-based database system 102, such as with respect to a data request (e.g., structured data query) that uses the AI model (e.g., language model) for processing at least some portion of the data request.

FIG. 3 is a block diagram 300 illustrating components of the execution platform 108, according to some example embodiments of the present disclosure. As shown in FIG. 3, the execution platform 108 includes multiple virtual warehouses, including virtual warehouse 1, virtual warehouse 2, and virtual warehouse N. Each virtual warehouse includes multiple execution nodes that each include a data cache and a processor. The virtual warehouses can execute multiple tasks in parallel by using the multiple execution nodes. As discussed herein, the execution platform 108 can add new virtual warehouses and drop existing virtual warehouses in real-time based on the current processing needs of the systems and users. This flexibility allows the execution platform 108 to quickly deploy large amounts of computing resources when needed without being forced to continue paying for those computing resources when they are no longer needed. All virtual warehouses can access data from any data storage device (e.g., any storage device in storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer useful.

Each virtual warehouse is capable of accessing any of the data storage devices 140-1 to 140-N shown in FIG. 1. Thus, the virtual warehouses are not necessarily assigned to a specific data storage device 140-1 to 140-N and, instead, can access data from any of the data storage devices 140-1 to 140-N within the storage platform 104. Similarly, each of the execution nodes shown in FIG. 3 can access data from any of the data storage devices 140-1 to 140-N. In some example embodiments, a particular virtual warehouse or a particular execution node can be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse N includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some example embodiments, the execution nodes shown in FIG. 3 are stateless with respect to the data being cached by the execution nodes. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some example embodiments, the caches are implemented using high-speed memory devices that provide fast access to the cached data. Each cache can store data from any of the storage devices in the storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some example embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor intensive. Similarly, an execution node may be assigned more cache resources if the tasks performed by the execution node require a larger cache capacity.

Although virtual warehouses 1, 2, and N are associated with the same execution platform 108, the virtual warehouses can be implemented using multiple computing systems at multiple geographic locations. For example, virtual warehouse 1 can be implemented by a computing system at a first geographic location, while virtual warehouses 2 and N are implemented by another computing system at a second geographic location. In some example embodiments, these different computing systems are cloud-based computing systems maintained by one or more different entities.

Additionally, each virtual warehouse is shown in FIG. 3 as having multiple execution nodes. The multiple execution nodes associated with each virtual warehouse can be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 108 is also fault tolerant. For example, if one virtual warehouse fails, that virtual warehouse is quickly replaced with a different virtual warehouse at a different geographic location. A particular execution platform 108 may include any number of virtual warehouses. Additionally, the number of virtual warehouses in a particular execution platform is dynamic, such that new virtual warehouses are created when additional processing and/or caching resources are needed. Similarly, existing virtual warehouses can be deleted when the resources associated with the virtual warehouse are no longer useful.

In some example embodiments, the virtual warehouses may operate on the same data in storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance.

Figure 4A:
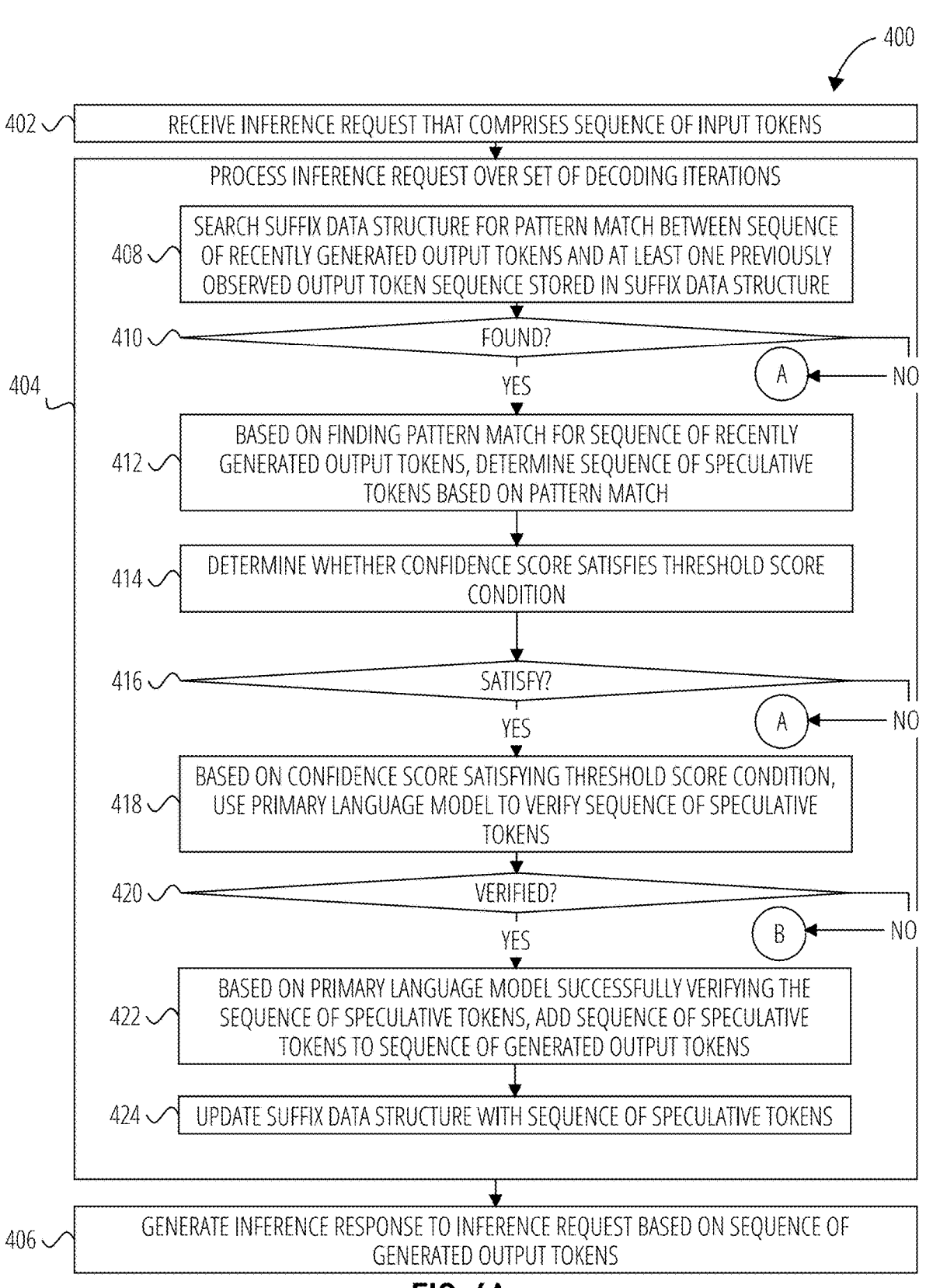
FIG. 4A and FIG. 4B illustrate a flowchart of an example method for suffix-based speculative token decoding for an AI model, according to some example embodiments of the present disclosure.
Figure 4B:
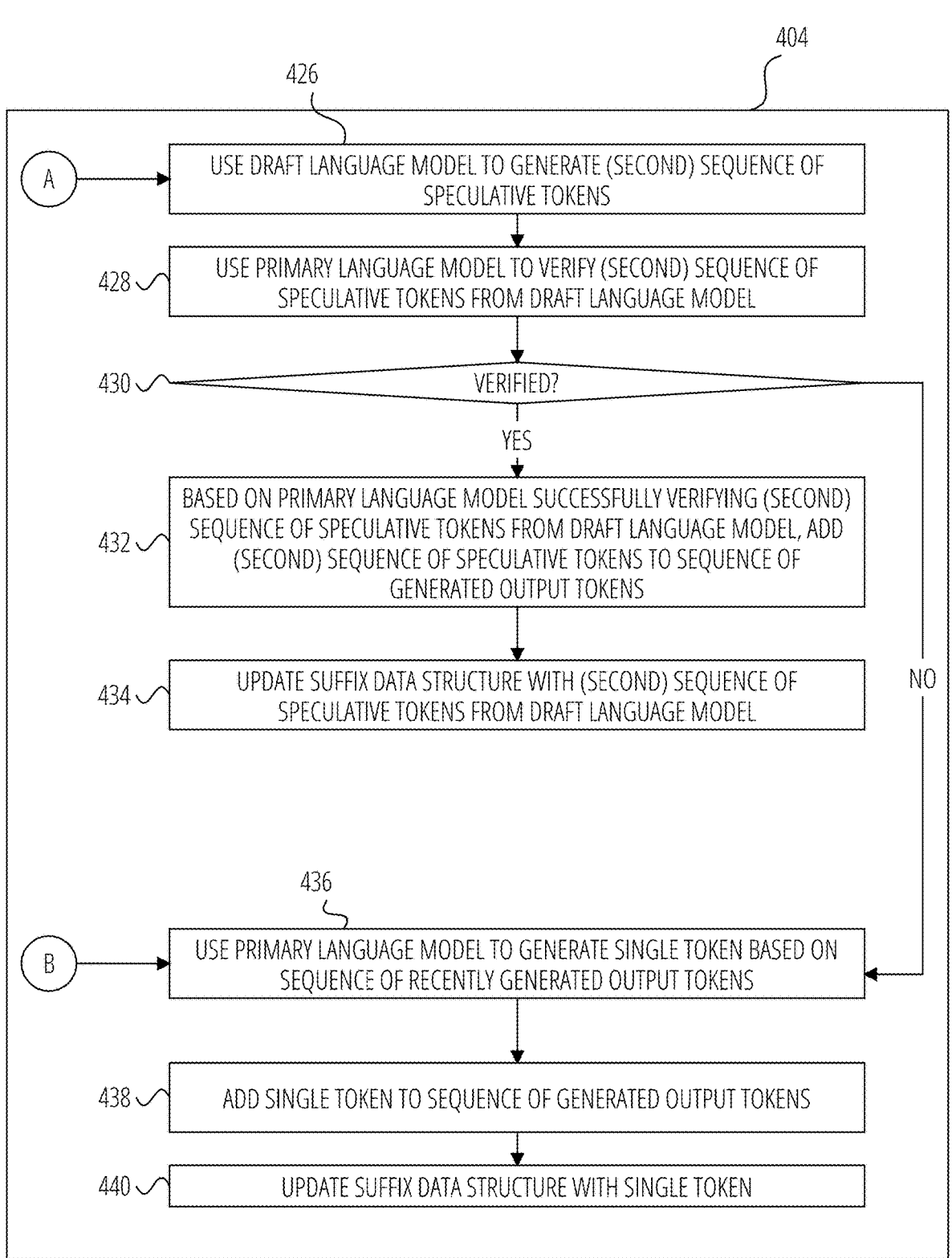

FIG. 4A and FIG. 4B illustrate a flowchart of an example method 400 for suffix-based speculative token decoding for an AI model, according to some example embodiments of the present disclosure. In particular, by method 400, a processor can efficiently perform speculative decoding for an AI model by leveraging previously observed token patterns stored in a suffix data structure, thereby improving the speed and efficiency of language model inference operations by the AI model. Method 400 may be embodied in computer-readable instructions for execution by one or more hardware components (e.g., one or more processors) such that the operations of method 400 can be performed by components of the AI model system 130 the network-based database system 102, such as a network node (e.g., the AI model system 130 executing on a network node of the compute service manager 106) or a computing device (e.g., client device 112), one or both of which may be implemented as machine 700 of FIG. 7 performing the disclosed functions. Accordingly, method 400 is described below, by way of example with reference thereto. However, it shall be appreciated that method 400 may be deployed on various other hardware configurations and is not intended to be limited to deployment within the network-based database system 102.

Referring now to FIG. 4A, at operation 402, a processor (e.g., implementing the AI model system 130) receives an inference request that comprises a sequence of input tokens. For example, the inference request can comprise a prompt (e.g., user or system prompt) that comprises the sequence of input tokens. In response to the inference request, at operation 404, the processor processes the inference request over a set (e.g., series) of decoding iterations. During a decoding iteration (e.g., during each decoding iteration), the processor can perform one or more of operations 408 through 440. According to various example embodiments, the set of decoding iterations performs the one or more operations to generate one or more output tokens using a suffix-based speculative decoding technique.

During an individual decoding iteration, at operation 408, the processor searches a suffix data structure for a pattern match between a sequence of recently generated output tokens (e.g., generated by one or more prior decoding iterations of the set of decoding iterations) and at least one previously observed output token sequence stored in the suffix data structure. According to various example embodiments, the sequence of recently generated output tokens is generated for (e.g., generated based on) a subsequence of the sequence of input tokens (e.g., generated by one or more prior decoding iterations of the set of decoding iterations). Depending on the example embodiment, the suffix data structure can comprise a suffix tree data structure, or alternatively, the suffix data structure can comprise a set of separate suffix tree data structures. For instance, the set of separate suffix tree data structures can comprise a first (e.g., global) suffix tree data structure maintained for previously generated output, and a second (e.g., per-request) suffix tree data structure maintained for a current ongoing inference request. An example of a suffix tree data structure is illustrated and described with respect to FIG. 6. A suffix tree data structure can maintain a compact cache of previously generated output token sequences. A suffix tree data structure can efficiently index and match repeating token patterns from both historical output token generations and a current sequence of input tokens. As described herein, the suffix tree data structure can facilitate determining a sequence of speculative tokens quickly, which can enable adaptive speculation of long speculative token sequences (e.g., longer than previously possible). Depending on the example embodiment, the generation (e.g., initial generation) of an individual suffix tree data structure can comprise two stages. During a first stage, previous token outputs (e.g., previous inference outputs) can be added to the individual suffix tree data structure in a single offline processing step (e.g., from historical logs), or online during inference serving (e.g., after each inference request completes). During a second stage, the current inference request and generated output tokens are added online as new requests are received, and as each new token is generated. For efficiency, some example embodiments maintain two or more separate suffix tree data structures that includes: a global suffix tree data structure for the previously generated outputs; and a per-request suffix tree data structure for the current ongoing inference request. The use of two or more separate suffix tree data structures can enable some example embodiments to avoid synchronizing the suffix tree updates from multiple concurrent requests.

According to various example embodiments, the sequence of recently generated output tokens is a token pattern sequence (also referred to herein as a suffix pattern sequence or suffix) that comprises a certain number of output tokens last added to a sequence of generated output tokens thus far determined (e.g., generated). Where the sequence of output tokens (e.g., ongoing inference sequence) is $x_{1:t}$, a suffix with length p can comprise $x_{1-p+1:t}$. Where the suffix data structure comprises one or more suffix tree data structures, the suffix can be used to traverse (e.g., walk through) an individual suffix tree data structure (of the one or more suffix tree data structures) based a sequence of tokens from the suffix, and to find a sequence of paths from a root node of the individual suffix tree data structure to a node $N_p$ of the individual suffix tree data structure, where each path in the sequence of paths corresponds sequentially to a token in the sequence of tokens of the suffix. A pattern match can be considered to be found if, during the search (e.g., traversal) of the individual suffix tree data structure, a path from a current node to a child node is always found. However, a pattern match can be considered not found in the individual suffix tree data structure if, at any point during the search (e.g., traversal) of the individual suffix tree data structure, a path from a current node to a child node is not found. After a node $N_p$ is found in the individual suffix tree data structure, paths (e.g., speculative token paths) descending from node $N_p$ to child nodes (each corresponding to a single token) can be considered possible continuations (e.g., continuing token sequences) of the suffix (which comprises the sequence of recently generated output tokens). Accordingly, these possible continuations can be used to generate a sequence of speculative tokens. In this way, the individual suffix tree data structure can be used to identify the longest sequence of speculative tokens that historically followed similar contexts stored (e.g., captured) by the individual suffix tree data structure. Consider the example where a sequence of previously observed output tokens comprises "A, B, C, D, E, F, G, H, I, J, K" is stored in the individual suffix tree data structure, the sequence of recently generated output tokens (e.g., current inference output) comprises "A, B, C, D," and the suffix being used has a length of 3 tokens. The suffix can comprise "B, C, D" and a search of the individual suffix tree data structure for the suffix can result in a pattern match at a node $N_P$ of the individual suffix data structure. Based on paths (to child nodes) from node $N_P$ of the individual suffix data structure, a sub-tree (e.g., speculative tree) can be determined (e.g., grown sub-tree greedily by expanding one leaf node at a time starting from node $N_P$), and the resulting sub-tree can be used to determine a sequence of speculative tokens (e.g., to speculate a continuation of the suffix) that comprises "E, F, G, H, I, J, K."

At decision point 410, based on (e.g., in response to) the processor finding the pattern match for the sequence of recently generated output tokens, method 400 proceeds to operation 412, otherwise method 400 proceeds to operation 426 (as shown in FIG. 4B).

For operation 412, the processor determines a sequence of speculative tokens based on the pattern match. For some example embodiments, operation 412 comprises determining a speculation length of the sequence of speculative tokens based on a length of the pattern match, where the sequence of speculative tokens is limited to the speculation length. In this way, the longer the pattern match, the longer the sequence of speculative tokens determined during operation 412. More regarding this is described with respect to Table 4.

For various example embodiments, where the suffix data structure comprises a set of separate suffix tree data structures (e.g., two or more suffix tree data structures, such as a global suffix data structure and a per-request suffix data structure), operation 408 comprises searching each individual suffix tree data structure of the set of separate suffix tree data structures for the pattern match between the sequence of recently generated output tokens and the at least one previously observed output token sequence stored in the individual suffix tree data structure. During operation 408, the processor can determine that the pattern match has been found when the pattern match is found in at least one suffix tree data structure of the set of separate suffix tree data structures. Additionally, during operation 412, for each single suffix tree data structure in the set of separate suffix tree data structures in which the pattern match is found, the processor can determine (e.g., expand or grow) a candidate sub-tree (e.g., speculative tree) that starts (e.g., expands) from a node (e.g., node $N_P$) of the single suffix tree data structure at which the pattern match ends. In particular, the processor can start at the node (e.g., node $N_P$) corresponding to the pattern match and grow the candidate sub-tree greedily from that node by expanding one leaf node at a time. By doing this for each single suffix tree data structure of the set of separate suffix tree data structures, a set of candidate sub-trees can result. The processor can determine a set of confidence scores that correspond to the set of candidate sub-trees (e.g., a confidence score for each candidate sub-tree). The processor can then determine from the set of candidate sub-trees, a select sub-tree (e.g., optimal candidate sub-tree) based on the select sub-tree corresponding to (e.g., having) a highest confidence score in the set of confidence scores. The processor can then determine (e.g., generate) the sequence of speculative tokens based on the select sub-tree. Table 3 herein describes an example of determining (e.g., calculating) a score (e.g., confidence score) for a sub-tree determined (e.g., generated) from a suffix tree data structure (e.g., either the global or per-request suffix tree data structure). More regarding determining and selecting a candidate sub-tree is described with respect to Table 2 herein.

During operation 414, the processor determines whether a confidence score of the sequence of speculative tokens satisfies a threshold score condition, where the confidence score estimates a likelihood that the sequence of speculative tokens is correctly speculated (e.g., likelihood that the sequence of speculative tokens will be verified or accepted by the primary language model). For example, the confidence score for the sequence of speculative tokens can represent the expected number of tokens likely to be accepted by the primary language model during verification (at operation 418). For some example embodiments, the confidence score of the sequence of speculative tokens is generated part of (e.g., during) operation 412, when the sequence of speculative tokens is determined based on the pattern match in the suffix data structure. According to some example embodiments, the confidence score satisfies the threshold score condition when the confidence score exceeds a threshold score value. In this way, the threshold score value (e.g., $\tau$) can determine the quality and reliability of the sequence of speculative tokens needed from suffix-based speculative token decoding in order to use the sequence of speculative tokens (rather than using a sequence generated by a draft language model). Depending on the example embodiment, the threshold score value can be user-defined (e.g., administrative user or end user), dynamically set/adjusted (e.g., based on system conditions, such as performance of the AI model system), or some combination thereof.

At decision point 416, based on (e.g., in response to) the processor determining that the confidence score satisfies the threshold score condition, method 400 proceeds to operation 418, otherwise method 400 proceeds to operation 426 (as shown in FIG. 4B). For operation 418, the processor use a primary language model to verify the sequence of speculative tokens determined at operation 414. For some embodiments, operation 418 comprises the primary language model receiving the sequence of input tokens and the sequence of speculative tokens (e.g., appended at the end of the sequence of input tokens) as input. The primary language model can then begin verifying (e.g., evaluating) speculative tokens (from the sequence of speculative tokens) within the input in parallel (e.g., within a single computational forward pass), and can accept (e.g., as verified) the sequence of speculative tokens within the input up to a first discrepancy, while discarding the rest of the sequence of speculative tokens within the input.

At decision point 420, based on (e.g., in response to) the processor determining that the primary language model successfully verified the sequence of speculative tokens (determined at operation 414), method 400 proceeds to operation 422, otherwise method 400 proceeds to operation 436 (as shown in FIG. 4B). Where the processor determines that the primary language model successfully verified the sequence of speculative tokens, the sequence of input tokens can be deemed to be accepted by the primary language model.

At operation 422, the processor adds the sequence of speculative tokens to the sequence of generated output tokens. This can result in a subsequent a subsequent decoding iteration of the set of decoding iterations using an updated sequence of recently generated output tokens. Additionally, at operation 424, the processor can update the suffix data structure with the sequence of speculative tokens. For some example embodiments, operation 424 is performed during a last decoding iteration, or right after the set of decoding iterations ends. By operation 424, method 400 can maintain the historical pattern information for future inference requests and can create a feedback mechanism that enhances pattern recognition capabilities over time. After operation 424, the set of decoding iterations can end or another decoding iteration can be performed (e.g., depending on whether a decoding condition is satisfied, such as the end of input token sequence being reached or a max number of tokens being generated by the set of decoding iterations).

Referring now to FIG. 4B, for operation 426, the processor uses a draft language model to generate another (second) sequence of speculative tokens. According to various example embodiments, the draft language model performs faster inference operations than the primary language model. Depending on the example embodiment, the draft language model can comprise one or more layers attached to one or more layers of the primary language model, or can comprise a smaller version of the primary language model (e.g., draft language model comprises less parameters or weights than the primary language model). For example, the draft language model can be created through distillation procedures to mimic the output of the primary language model.

From operation 426, method 400 proceeds to operation 428, where the processor uses the primary language model to verify the second sequence of speculative tokens generated by the draft language model (at operation 426). At decision point 430, based on (e.g., in response to) the processor determining that the primary language model successfully verified the second sequence of speculative tokens (determined at operation 426), method 400 proceeds to operation 432, otherwise method 400 proceeds to operation 436 (as shown in FIG. 4B).

During operation 432, the processor adds the second sequence of speculative tokens to the sequence of generated output tokens. This can result in a subsequent a subsequent decoding iteration of the set of decoding iterations using an updated sequence of recently generated output tokens. Eventually, at operation 434, the processor can update the suffix data structure with the second sequence of speculative tokens from the draft language model. For some example embodiments, operation 434 is performed during a last decoding iteration, or right after the set of decoding iterations ends. By operation 434, method 400 can maintain the historical pattern information for future inference requests and can create a feedback mechanism that enhances pattern recognition capabilities over time. After operation 434, the set of decoding iterations can end or another decoding iteration can be performed (e.g., depending on whether a decoding condition is satisfied, such as the end of input token sequence being reached or a max number of tokens being generated by the set of decoding iterations).

For operation 436, the processor uses the primary language model to generate a single token based on the sequence of recently generated output tokens and, at operation 438, the processor adds the single token to the sequence of generated output tokens. This can result in a subsequent a subsequent decoding iteration of the set of decoding iterations using an updated sequence of recently generated output tokens. Eventually, at operation 440, the processor can update the suffix data structure with the single token (generated at operation 436). For some example embodiments, operation 440 is performed during a last decoding iteration, or right after the set of decoding iterations ends. By operation 440, method 400 can maintain the historical pattern information for future inference requests and can create a feedback mechanism that enhances pattern recognition capabilities over time. After operation 440, the set of decoding iterations can end or another decoding iteration can be performed (e.g., depending on whether a condition is satisfied, such as end of input token sequence has been reached or a max number of tokens have been generated by the set of decoding iterations).

After operation 404 (e.g., when the set of decoding iterations ends), at operation 406, the processor generates an inference response to the inference request based on the sequence of generated output tokens generated by the set of decoding iterations. As described herein, the set of decoding iterations can end upon satisfaction of a decoding condition, such as the end of input token sequence being reached or a max number of tokens having been generated by the set of decoding iterations. According to various example embodiments, the sequence of generated output tokens can be updated with one or more tokens by one or more of operations 422, 432, or 438.

The following description and tables provide an example for implementing one or more aspects of method 400 in accordance with various example embodiments. Referring now to Table 1, Table 1 provides an example of how a sub-tree (e.g., speculation tree) can be determined (e.g., generated or expanded) from a suffix tree data structure using scoring functions (e.g., frequency-based scoring functions) C(N) and D(N), in accordance with various example embodiments.

TABLE 1

$$C(N) = \frac{\text{COUNT}(N)}{\sum_{M \in \text{CHILDREN}(\text{PARENT}(N))} \text{COUNT}(M)}$$

$D(N) = \{D(\text{PARENT}(N)) \times C(N) \text{ if } N = N_p, 1 \text{ otherwise}\}$,
where COUNT(N) is the number of occurrences of node N in the reference corpus, which can be computed when constructing a suffix tree data structure.

Starting with the single node $N_p$ in a candidate sub-tree, an example embodiment can consider all children of all of its leaf nodes, and add the node N with highest D(N). This process can be repeated until a candidate sub-tree reaches a predetermined size limit, defined as MAX_SPEC (e.g., see Table 4 herein).

The following Table 2 provides an example algorithm for sub-tree (e.g., speculative tree) determination (e.g., generation), where one or more candidate sub-trees are determined from one or more suffix tree data structures (e.g., global suffix data structure and per-request suffix data structure) and where a single candidate sub-tree is determined (e.g., identified or selected) based on scoring.

TABLE 2

```
function EXPANDSPECULATIONTREE (N_p, MAX_SPEC)
Input: Suffix tree node N_p, MAX_SPEC Initialize T ← {N_p}
while |T| < MAX_SPEC do
    N ← arg max_N ∈_CHILDREN(LEAVES(T)) D(N )
    T ← T U {N }
end while return T
end function
function MATCHPATTERN (S, x_1:p, p)
Input: Suffix tree S, sequence x_1:p, length p
Initialize N_p ← ROOT(S)
for i = 1 to p do
    if NO_CHILD (N_p, x_t-p+i) then
        return ∅
    end if
```

TABLE 2-continued

```
    N_p ← CHILD (N_p, x_t-p+i)
    end for
    return N_p
end function
function GENERATECANDIDATETREE (Sg, Sr, x_1:p, α, P)
Input: Global suffix tree Sg, prompt suffix tree Sr, sequence
    x_1:p, max spec factor α, max pattern size P
Initialize T_best ← ∅, SCORE_best ← 0
for S in {Sg, Sr} do
    for p = 1 to P do
        N ← MatchPattern ( S, x_1:p, p)
        T ← ExpandSpeculationTree (N, αp)
        if SCORE (T ) > SCORE_best then
            T_best ← T
            SCORE_best ← SCORE (T )
        end if
    end for
end for return T_best
end function
```

The following Table 3 provides an example of how a sub-tree (e.g., speculation tree expansion) can be scored using a scoring function based on D(N) of Table 1, in accordance with various example embodiments.

TABLE 3

$$\text{SCORE}(T_{spec}) = \sum_{N \in T_{spec}} D(N)$$

If D(N) estimates the probability that node N in a sub-tree $T_{spec}$ would be accepted, then SCORE($T_{spec}$) estimates the expected number of accepted tokens.

As described herein, two or more suffix tree data structures can be maintained (e.g., a global suffix tree data structure and a per-request suffix tree data structure, as in the algorithm of Table 2, each with many choices for p) to determine (e.g., select) a single candidate sub-tree. For such example embodiments, a sub-tree can be determined (e.g., generated for each suffix tree data structure (e.g., for both the global suffix tree data structure and the per-request suffix tree data structure for a range of values of p), and a single sub-tree can be selected from the resulting set of candidate sub-trees according to the scoring function of SCORE($T_{spec}$) described in Table 3.

Additionally, where the SCORE($T_{spec}$) is used to generate (e.g., calculate) scores of individual candidate sub-trees, the score generated for the single sub-tree selected can be used (e.g., during operation 414) to dynamically determine between using a sequence of speculative tokens determined (e.g., generated) using the single sub-tree (selected from the set of candidate sub-trees) or using a sequence of speculative tokens generated using a draft language model.

The following Table 4 provides an example definition for adaptively controlling the number of tokens speculated using a sub-tree of a suffix tree data structure, in accordance with various example embodiments.

TABLE 4

MAX_SPEC(p) = αp,
where α is a user-defined max speculation factor, and p is the length of the speculative token sequence to be determined using a suffix tree data structure.

While the various example embodiments allows a suffix tree data structure to cache and quickly speculate long token sequences, some example embodiments use a mechanism for adaptively controlling the number of tokens speculated using a suffix tree data structure. Some example embodiments achieve this by dynamically adjusting MAX_SPEC as defined in Table 4. A low value can lead to fewer tokens that are more likely to be verified (e.g., accepted) by a primary language model, while higher values can lead to more tokens that are less likely to be verified (e.g., accepted) by the primary language model. If the value is too low, a resulting speedup from speculation can be limited, and if the value is too high, then compute may be wasted on verifying unacceptable tokens. For various example embodiments, setting MAX_SPEC adaptively according to the pattern length (e.g., as defined in Table 4) can result in a better trade-off between acceptance rate and speculative speedup.

Figure 5:
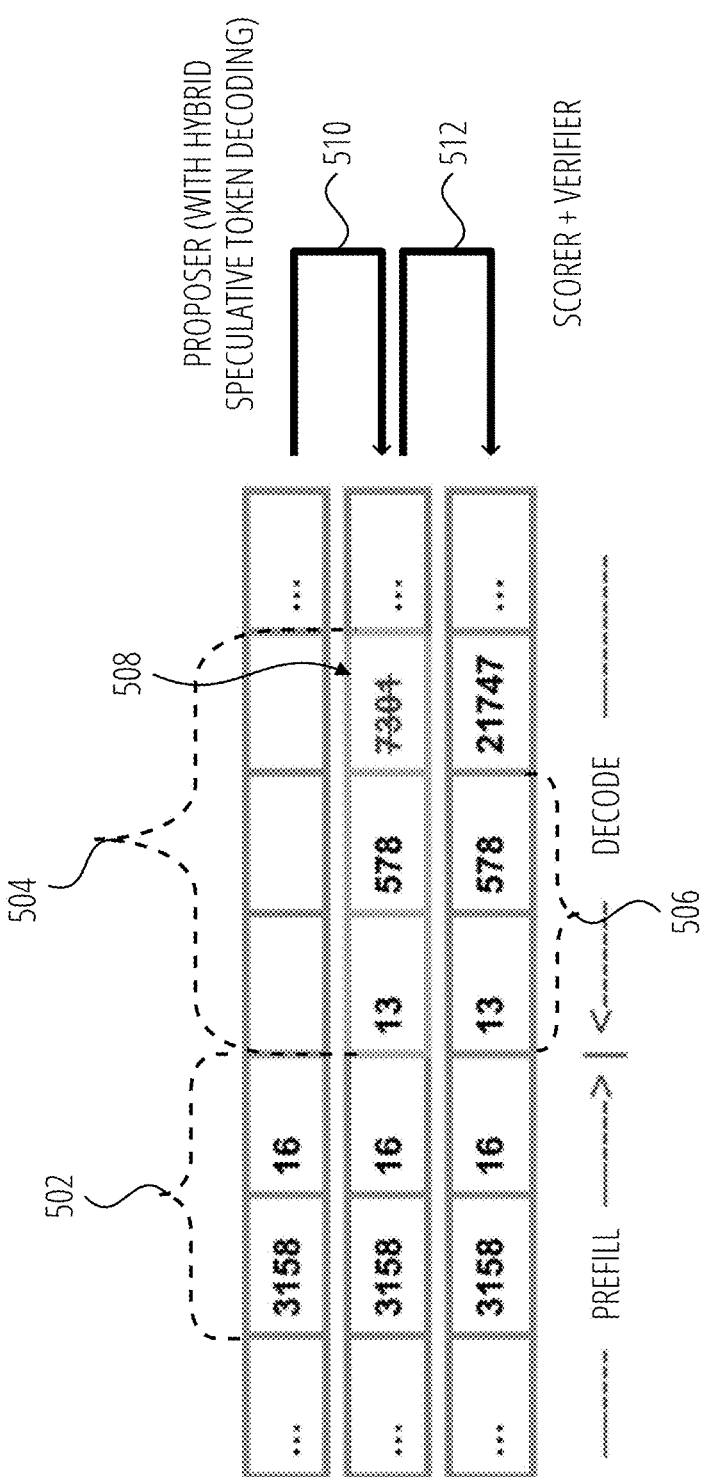
FIG. 5 illustrates an example of a hybrid speculative token decoding, according to some example embodiments of the present disclosure.

FIG. 5 illustrates an example of a hybrid speculative token decoding, according to some example embodiments of the present disclosure. FIG. 5 includes an input token sequence 502, a speculative token sequence 504, an accepted portion 506 of the speculative token sequence 504, a rejected (remaining) portion 508 of speculative token sequence 504, a proposer stage 510, and a score and verification stage 512. The illustrated hybrid speculative token decoding approach demonstrates how speculative decoding can function in a single decoding step.

In some example embodiments, using the states generated from the prefill step (where input token sequence 502 is processed), the proposer stage 510 speculates three additional tokens: 13, 578 and 7301. The proposer stage 510 can operate as part of the hybrid speculative token decoding system to generate candidate tokens, either by a suffix data structure or by a draft AI model, for subsequent verification by a primary AI model. The speculative token sequence 504 represents the tokens generated during this speculation phase.

Various example embodiments include a scorer and verifier stage 512 that runs the primary AI model, which in parallel obtains the token IDs of the last verified token plus the speculated tokens, which are 16, 13, 578, and 7301. For some example embodiments, during the scorer and verifier stage 512, a sampling strategy is implemented to determine the acceptability of the speculated tokens.

According to some example embodiments, the primary AI model determines that tokens 13 and 578 are acceptable from the speculated tokens and appends token 21747 as the last verified token. The accepted portion 506 represents the speculative token (from the speculative token sequence generated during the proposer stage 510) that have been verified and accepted by the primary AI model, while the rejected (remaining) portion 508 represents remaining speculated tokens (in the speculative token sequence generated during the proposer stage 510) that were not accepted during the verification process.

Figure 6:
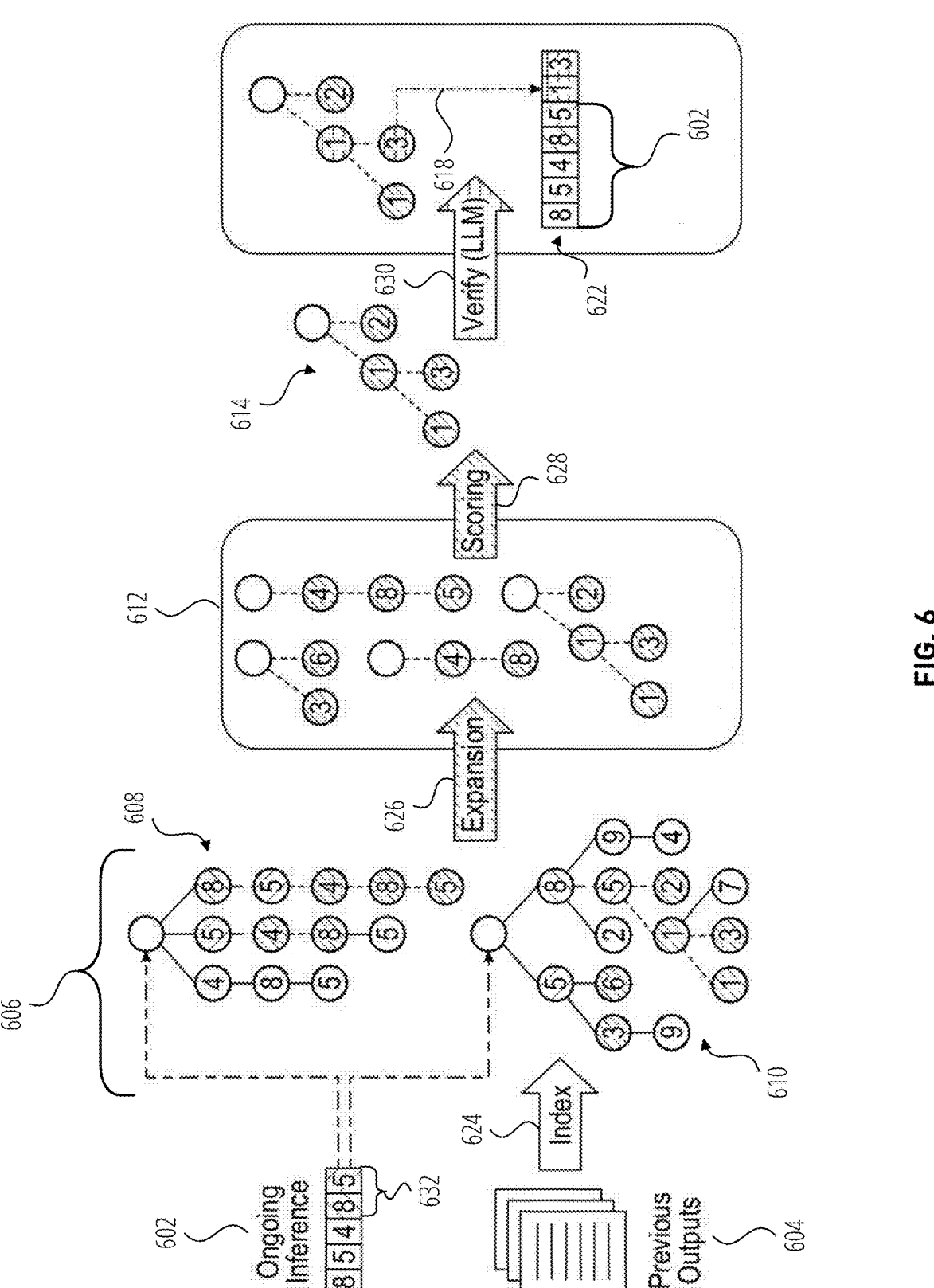
FIG. 6 illustrates an example of suffix-based speculative token decoding for an AI model, according to some example embodiments of the present disclosure.

FIG. 6 illustrates an example of suffix-based speculative token decoding for an AI model, according to some example embodiments of the present disclosure. FIG. 6 includes a recently generated output token sequence 602, a suffix 632 from the recently generated output token sequence 602, one or more previous output token sequences 604, a suffix tree data structure 606 that comprises a per-request suffix data structure 608 and a global suffix data structure 610, a set of candidate sub-trees 612, a selected sub-tree 614 (selected from the set of candidate sub-trees 612), a speculative token sequence 618, a current output token sequence 622, an index operation 624, an expansion operation 626, a scoring operation 628, and a verification and generation operation 630.

As noted, the suffix tree data structure 606 comprises both the per-request suffix data structure 608 and the global suffix data structure 610. For various example embodiments, the per-request suffix data structure 608 tracks ongoing inference patterns specific to the current request, while the global suffix data structure 610 maintains patterns from the one or more previous output token sequences 604. Historical outputs from past generations (represented by one or more previous output token sequences 604) and the current prompt context are decomposed into token suffixes and indexed (by index operation 624) into the global suffix data structure 610 and the per-request suffix data structure 608, allowing very rapid lookups of repeating patterns, according to some example embodiments.

During operation, the suffix 632 of recently generated output token sequence 602 is matched against the per-request suffix data structure 608 and the global suffix data structure 610. The suffix 632 from the recently generated output token sequence 602 serves as the basis for pattern matching within the suffix tree data structures. For each suffix tree data structure that includes a pattern match of the suffix 632, during the expansion operation 626, a sub-tree (e.g., speculative tree) is determined (e.g., generated). These are represented as the set of candidate sub-trees 612. Each of the candidate sub-trees 612 can represent potential continuation patterns for the suffix 632.

During the scoring operation 628, the confidence score for each sub-tree of the set of candidate sub-trees 612 is determined, and the sub-tree having the best confidence score is selected (as the selected sub-tree 614). During the verification and generation operation 630, a speculative token sequence 618 is generated using the selected sub-tree 614, and the speculative token sequence 618 is verified using a primary language model. If accepted by the primary language model, the speculative token sequence 618 is appended to the end of the current output token sequence 622, which already contains the recently generated output token sequence 602.

Figure 7:
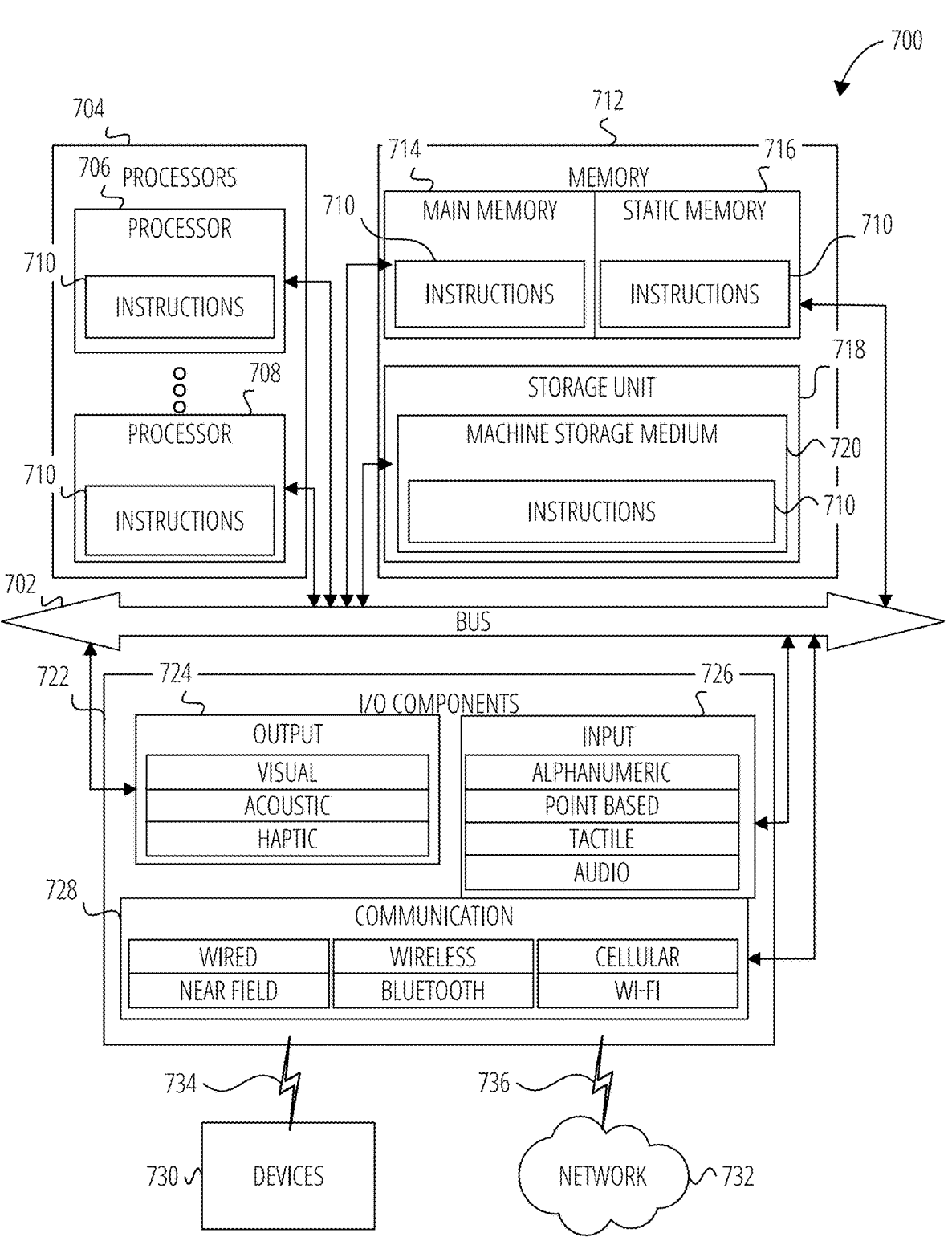
FIG. 7 illustrates a diagrammatic representation of a machine in the form of a computer system within which a set of instructions can be executed for causing the machine to perform any one or more of the methodologies discussed herein, according to some example embodiments of the present disclosure.

FIG. 7 illustrates a diagrammatic representation of a machine 700 in the form of a computer system within which a set of instructions can be executed for causing the machine 700 to perform any one or more of the methodologies discussed herein, according to some example embodiments of the present disclosure. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein can be executed. For example, the instructions 710 may cause the machine 700 to execute any one or more operations of any one or more of the methods described herein. As another example, the instructions 710 may cause the machine 700 to implement portions of the data flows described herein. In this way, the instructions 710 transform a general, non-programmed machine into a particular machine 700 (e.g., the compute service manager 106, the execution platform 108, client device 112) that is specially configured to carry out any one of the described and illustrated functions in the manner described herein.

In alternative embodiments, the machine 700 operates as a standalone device or can be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 710, sequentially or otherwise, that specify actions to be taken by the machine 700. Further, while only a single machine 700 is illustrated, the term "machine" shall also be taken to include a collection of machines machine 700 that individually or jointly execute the instructions 710 to perform any one or more of the methodologies discussed herein.

The machine 700 includes processors 704, memory 712, and input/output (I/O) components 722 configured to communicate with each other such as via a bus 702. In an example embodiment, the processors 704 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 706 and a processor 708 that may execute the instructions 710. The term "processor" is intended to include multi-core processors 704 that may comprise two or more independent processors (sometimes referred to as "cores") that may execute instructions 710 contemporaneously. Although FIG. 7 shows multiple processors 704, the machine 700 may include a single processor with a single core, a single processor with multiple cores (e.g., a multi-core processor), multiple processors with a single core, multiple processors with multiple cores, or any combination thereof.

The memory 712 may include a main memory 714, a static memory 716, and a storage unit 718, all accessible to the processors 704 such as via the bus 702. The main memory 714, the static memory 716, and the storage unit 718 comprising a machine storage medium 720 may store the instructions 710 embodying any one or more of the methodologies or functions described herein. The instructions 710 may also reside, completely or partially, within the main memory 714, within the static memory 716, within the storage unit 718, within at least one of the processors 704 (e.g., within the processor's cache memory), or any suitable combination thereof, during execution thereof by the machine 700.

The I/O components 722 include components to receive input, provide output, produce output, transmit information, exchange information, capture measurements, and so on. The specific I/O components 722 that are included in a particular machine 700 will depend on the type of machine. For example, portable machines such as mobile phones will likely include a touch input device or other such input mechanisms, while a headless server machine will likely not include such a touch input device. It will be appreciated that the I/O components 722 may include many other components that are not shown in FIG. 7. The I/O components 722 are grouped according to functionality merely for simplifying the following discussion and the grouping is in no way limiting. In various example embodiments, the I/O components 722 may include output components 724 and input components 726. The output components 724 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 726 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication can be implemented using a wide variety of technologies. The I/O components 722 may include communication components 728 operable to couple the machine 700 to a network 732 via a coupling 736 or to devices 730 via a coupling 734. For example, the communication components 728 may include a network interface component or another suitable device to interface with the network 732. In further examples, the communication components 728 may include wired communication components, wireless communication components, cellular communication components, and other communication components to provide communication via other modalities. The devices 730 can be another machine or any of a wide variety of peripheral devices (e.g., a peripheral device coupled via a universal serial bus (USB)). For example, as noted above, the machine 700 may correspond to any client device, the compute service manager 106, the execution platform 108, and the devices 730 may include any other of these systems and devices.

The various memories (e.g., 712, 714, 716, and/or memory of the processor(s) 704 and/or the storage unit 718) may store one or more sets of instructions 710 and data structures (e.g., software) embodying or utilized by any one or more of the methodologies or functions described herein. These instructions 710, when executed by the processor(s) 704, cause various operations to implement the disclosed embodiments.

As used herein, the terms "machine-storage medium," "device-storage medium," and "computer-storage medium" mean the same thing and can be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage medium," "computer-storage medium," and "device-storage medium" specifically exclude carrier waves, modulated data signals, and other such media, at least some of which are covered under the term "signal medium" discussed below.

In various example embodiments, one or more portions of the network 732 can be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 732 or a portion of the network 732 may include a wireless or cellular network, and the coupling 736 can be a Code Division Multiple Access (CDMA) connection, a Global System for Mobile communications (GSM) connection, or another type of cellular or wireless coupling. In this example, the coupling 736 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 710 can be transmitted or received over the network 732 using a transmission medium via a network interface device (e.g., a network interface component included in the communication components 728) and utilizing any one of a number of well-known transfer protocols (e.g., hypertext transfer protocol (HTTP)). Similarly, the instructions 710 can be transmitted or received using a transmission medium via the coupling 734 (e.g., a peer-to-peer coupling) to the devices 730. The terms "transmission medium" and "signal medium" mean the same thing and can be used interchangeably in this disclosure. The terms "transmission medium" and "signal medium" shall be taken to include any intangible medium that is capable of storing, encoding, or carrying the instructions 710 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the disclosed methods may be performed by one or more processors. The performance of certain operations may be distributed among the one or more processors, not only residing within a single machine but also deployed across several machines. In some example embodiments, the processor or processors may be located in a single location (e.g., within a home environment, an office environment, or a server farm), while in other example embodiments the processors may be distributed across several locations.

Described implementations of the subject matter can include one or more features, alone or in combination as illustrated below by way of examples.

Example 1 is a system comprising: at least one processor; and at least one memory storing instructions that cause the at least one processor to perform operations comprising: receiving an inference request that comprises a sequence of input tokens; processing the inference request over a set of decoding iterations, during an individual decoding iteration of the set of decoding iterations: searching a suffix data structure for a pattern match between a sequence of recently generated output tokens and at least one previously observed output token sequence stored in the suffix data structure, the sequence of recently generated output tokens being generated for a subsequence of the sequence of input tokens; and based on finding the pattern match for the sequence of recently generated output tokens: determining a sequence of speculative tokens based on the pattern match; determining whether a confidence score of the sequence of speculative tokens satisfies a threshold score condition, the confidence score estimating a likelihood that the sequence of speculative tokens is correctly speculated; based on the confidence score satisfying the threshold score condition, using a primary language model to verify the sequence of speculative tokens; and based on the primary language model successfully verifying the sequence of speculative tokens, adding the sequence of speculative tokens to a sequence of generated output tokens; and after the set of decoding iterations ends, generating an inference response to the inference request based on the sequence of generated output tokens generated by the set of decoding iterations.

In Example 2, the subject matter of Example 1 includes, wherein the confidence score satisfies the threshold score condition when the confidence score exceeds a threshold score value.

In Example 3, the subject matter of Examples 1-2 includes, wherein the operations comprise: based on the primary language model failing to verify the sequence of speculative tokens: using the primary language model to generate a single token based on the sequence of recently generated output tokens; and adding the single token to the sequence of generated output tokens.

In Example 4, the subject matter of Examples 1-3 includes, wherein the sequence of speculative tokens is a first sequence of speculative tokens, and wherein the operations comprise: based on not finding the pattern match for the sequence of recently generated output tokens or based on the confidence score not satisfying the threshold score condition: using a draft language model to generate a second sequence of speculative tokens, the draft language model performing faster inference operations than the primary language model; using the primary language model to verify the second sequence of speculative tokens; and based on the primary language model successfully verifying the second sequence of speculative tokens, adding the second sequence of speculative tokens to the sequence of generated output tokens.

In Example 5, the subject matter of Example 4 includes, wherein the draft language model comprises one or more layers attached to one or more layers of the primary language model.

In Example 6, the subject matter of Examples 4-5 includes, wherein the draft language model comprises a smaller version of the primary language model.

In Example 7, the subject matter of Examples 4-6 includes, wherein the operations comprise: based on the primary language model successfully verifying the second sequence of speculative tokens, updating the suffix data structure with the second sequence of speculative tokens.

In Example 8, the subject matter of Examples 4-7 includes, wherein the operations comprise: based on the primary language model failing to verify the second sequence of speculative tokens: using the primary language model to generate a single token based on the sequence of recently generated output tokens; and adding the single token to the sequence of generated output tokens.

In Example 9, the subject matter of Examples 1-8 includes, wherein the suffix data structure comprises a suffix tree data structure.

In Example 10, the subject matter of Examples 1-9 includes, wherein the suffix data structure comprises a set of separate suffix tree data structures, and wherein the searching of the suffix data structure for the pattern match between the sequence of recently generated output tokens and the at least one previously observed output token sequence stored in the suffix data structure comprises: searching each individual suffix tree data structure of the set of separate suffix tree data structures for the pattern match between the sequence of recently generated output tokens and the at least one previously observed output token sequence stored in the individual suffix tree data structure; and determining that the pattern match has been found when the pattern match is found in at least one suffix tree data structure of the set of separate suffix tree data structures.

In Example 11, the subject matter of Example 10 includes, wherein the determining of the sequence of speculative tokens based on the pattern match comprises: determining a set of candidate sub-trees by determining, for each single suffix tree data structure in the set of separate suffix tree data structures in which the pattern match is found, a candidate sub-tree that starts from a node of the single suffix tree data structure at which the pattern match ends; determining a set of confidence scores that correspond to the set of candidate sub-trees; determining, from the set of candidate sub-trees, a select sub-tree based on the select sub-tree corresponding to a highest confidence score in the set of confidence scores; and determining the sequence of speculative tokens based on the select sub-tree.

In Example 12, the subject matter of Example 11 includes, wherein each confidence score in the set of confidence scores comprises a frequency-based score.

In Example 13, the subject matter of Examples 10-12 includes, wherein the set of separate suffix tree data structures comprises: a first suffix tree data structure maintained for previously generated output; and a second suffix tree data structure maintained for a current ongoing inference request.

In Example 14, the subject matter of Examples 1-13 includes, wherein the determining of the sequence of speculative tokens comprises: determining a speculation length based on a length of the pattern match, the sequence of speculative tokens being limited to the speculation length.

Example 15 is a method to implement any of Examples 1-14.

Example 16 is a machine-storage medium storing instructions that when executed by a machine, cause the machine to perform operations to implement any of Examples 1-14.

Although the example embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other example embodiments may be used and derived therefrom, such that structural and logical substitutions and changes may be made without departing from the scope of this disclosure. This Detailed Description, therefore, is not to be taken in a limiting sense, and the scope of various example embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various example embodiments. Combinations of the above embodiments, and other example embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:

at least one processor; and at least one memory storing instructions that cause the at least one processor to perform operations comprising:

receiving an inference request that comprises a sequence of input tokens;

processing the inference request over a set of decoding iterations, during an individual decoding iteration of the set of decoding iterations:

searching a suffix data structure for a pattern match between a sequence of recently generated output tokens and at least one previously observed output token sequence stored in the suffix data structure, the sequence of recently generated output tokens being generated for a subsequence of the sequence of input tokens; and based on finding the pattern match for the sequence of recently generated output tokens:

determining a sequence of speculative tokens based on the pattern match;

determining whether a confidence score of the sequence of speculative tokens satisfies a threshold score condition, the confidence score estimating a likelihood that the sequence of speculative tokens is correctly speculated;

based on the confidence score satisfying the threshold score condition, using a primary language model to verify the sequence of speculative tokens; and based on the primary language model successfully verifying the sequence of speculative tokens, adding the sequence of speculative tokens to a sequence of generated output tokens; and after the set of decoding iterations ends, generating an inference response to the inference request based on the sequence of generated output tokens.

2. The system of claim 1, wherein the confidence score satisfies the threshold score condition when the confidence score exceeds a threshold score value.

3. The system of claim 1, wherein the operations comprise:

based on the primary language model failing to verify the sequence of speculative tokens:

using the primary language model to generate a single token based on the sequence of recently generated output tokens; and adding the single token to the sequence of generated output tokens.

4. The system of claim 1, wherein the sequence of speculative tokens is a first sequence of speculative tokens, and wherein the operations comprise:

based on not finding the pattern match for the sequence of recently generated output tokens or based on the confidence score not satisfying the threshold score condition:

using a draft language model to generate a second sequence of speculative tokens, the draft language model performing faster inference operations than the primary language model;

using the primary language model to verify the second sequence of speculative tokens; and based on the primary language model successfully verifying the second sequence of speculative tokens, adding the second sequence of speculative tokens to the sequence of generated output tokens.

5. The system of claim 4, wherein the draft language model comprises one or more layers attached to one or more layers of the primary language model.

6. The system of claim 4, wherein the draft language model comprises a smaller version of the primary language model.

7. The system of claim 4, wherein the operations comprise:

based on the primary language model successfully verifying the second sequence of speculative tokens, updating the suffix data structure with the second sequence of speculative tokens.

8. The system of claim 4, wherein the operations comprise:

based on the primary language model failing to verify the second sequence of speculative tokens:

using the primary language model to generate a single token based on the sequence of recently generated output tokens; and adding the single token to the sequence of generated output tokens.

9. The system of claim 1, wherein the suffix data structure comprises a suffix tree data structure.

10. The system of claim 1, wherein the suffix data structure comprises a set of separate suffix tree data structures, and wherein the searching of the suffix data structure for the pattern match between the sequence of recently generated output tokens and the at least one previously observed output token sequence stored in the suffix data structure comprises:

searching each individual suffix tree data structure of the set of separate suffix tree data structures for the pattern match between the sequence of recently generated output tokens and the at least one previously observed output token sequence; and determining that the pattern match has been found when the pattern match is found in at least one suffix tree data structure of the set of separate suffix tree data structures.

11. The system of claim 10, wherein the determining of the sequence of speculative tokens based on the pattern match comprises:

determining a set of candidate sub-trees by determining, for each single suffix tree data structure in the set of separate suffix tree data structures in which the pattern match is found, a candidate sub-tree that starts from a node of the single suffix tree data structure at which the pattern match ends;

determining a set of confidence scores that correspond to the set of candidate sub-trees;

determining, from the set of candidate sub-trees, a select sub-tree based on the select sub-tree corresponding to a highest confidence score in the set of confidence scores; and determining the sequence of speculative tokens based on the select sub-tree.

12. The system of claim 11, wherein each confidence score in the set of confidence scores comprises a frequency-based score.

13. The system of claim 10, wherein the set of separate suffix tree data structures comprises:

a first suffix tree data structure maintained for previously generated output; and a second suffix tree data structure maintained for a current ongoing inference request.

14. The system of claim 1, wherein the determining of the sequence of speculative tokens comprises:

determining a speculation length based on a length of the pattern match, the sequence of speculative tokens being limited to the speculation length.

15. A method comprising:

receiving, by at least one processor, an inference request that comprises a sequence of input tokens;

processing, by the at least one processor, the inference request over a set of decoding iterations, during an individual decoding iteration of the set of decoding iterations:

searching a suffix data structure for a pattern match between a sequence of recently generated output tokens and at least one previously observed output token sequence stored in the suffix data structure, the sequence of recently generated output tokens being generated for a subsequence of the sequence of input tokens; and based on finding the pattern match for the sequence of recently generated output tokens:

determining a sequence of speculative tokens based on the pattern match;

determining whether a confidence score of the sequence of speculative tokens satisfies a threshold score condition, the confidence score estimating a likelihood that the sequence of speculative tokens is correctly speculated;

based on the confidence score satisfying the threshold score condition, using a primary language model to verify the sequence of speculative tokens; and based on the primary language model successfully verifying the sequence of speculative tokens, adding the sequence of speculative tokens to a sequence of generated output tokens; and after the set of decoding iterations ends, generating, by the at least one processor, an inference response to the inference request based on the sequence of generated output tokens.

16. The method of claim 15, wherein the confidence score satisfies the threshold score condition when the confidence score exceeds a threshold score value.

17. The method of claim 15, comprising:

based on the primary language model failing to verify the sequence of speculative tokens:

using, by the at least one processor, the primary language model to generate a single token based on the sequence of recently generated output tokens; and adding, by the at least one processor, the single token to the sequence of generated output tokens.

18. The method of claim 15, wherein the sequence of speculative tokens is a first sequence of speculative tokens, and wherein the method comprises:

based on not finding the pattern match for the sequence of recently generated output tokens or based on the confidence score not satisfying the threshold score condition:

using, by the at least one processor, a draft language model to generate a second sequence of speculative tokens, the draft language model performing faster inference operations than the primary language model;

using, by the at least one processor, the primary language model to verify the second sequence of speculative tokens; and based on the primary language model successfully verifying the second sequence of speculative tokens, adding, by the at least one processor, the second sequence of speculative tokens to the sequence of generated output tokens.

19. The method of claim 18, wherein the draft language model comprises one or more layers attached to one or more layers of the primary language model.

20. The method of claim 18, wherein the draft language model comprises a smaller version of the primary language model.

21. The method of claim 18, comprising:

based on the primary language model successfully verifying the second sequence of speculative tokens, updating, by the at least one processor, the suffix data structure with the second sequence of speculative tokens.

22. The method of claim 18, comprising:

based on the primary language model failing to verify the second sequence of speculative tokens:

using, by the at least one processor, the primary language model to generate a single token based on the sequence of recently generated output tokens; and adding, by the at least one processor, the single token to the sequence of generated output tokens.

23. The method of claim 15, wherein the suffix data structure comprises a suffix tree data structure.

24. The method of claim 15, wherein the suffix data structure comprises a set of separate suffix tree data structures, and wherein the searching of the suffix data structure for the pattern match between the sequence of recently generated output tokens and the at least one previously observed output token sequence stored in the suffix data structure comprises:

searching each individual suffix tree data structure of the set of separate suffix tree data structures for the pattern match between the sequence of recently generated output tokens and the at least one previously observed output token sequence; and determining that the pattern match has been found when the pattern match is found in at least one suffix tree data structure of the set of separate suffix tree data structures.

25. The method of claim 24, wherein the determining of the sequence of speculative tokens based on the pattern match comprises:

determining a set of candidate sub-trees by determining, for each single suffix tree data structure in the set of separate suffix tree data structures in which the pattern match is found, a candidate sub-tree that starts from a node of the single suffix tree data structure at which the pattern match ends;

determining a set of confidence scores that correspond to the set of candidate sub-trees;

determining, from the set of candidate sub-trees, a select sub-tree based on the select sub-tree corresponding to a highest confidence score in the set of confidence scores; and determining the sequence of speculative tokens based on the select sub-tree.

26. The method of claim 25, wherein each confidence score in the set of confidence scores comprises a frequency-based score.

27. The method of claim 24, wherein the set of separate suffix tree data structures comprises:

a first suffix tree data structure maintained for previously generated output; and a second suffix tree data structure maintained for a current ongoing inference request.

28. The method of claim 15, wherein the determining of the sequence of speculative tokens comprises:

determining a speculation length based on a length of the pattern match, the sequence of speculative tokens being limited to the speculation length.

29. A machine-storage medium storing instructions that when executed by a machine, cause the machine to perform operations comprising:

receiving an inference request that comprises a sequence of input tokens;

processing the inference request over a set of decoding iterations, during an individual decoding iteration of the set of decoding iterations:

searching a suffix data structure for a pattern match between a sequence of recently generated output tokens and at least one previously observed output token sequence stored in the suffix data structure, the sequence of recently generated output tokens being generated for a subsequence of the sequence of input tokens; and based on finding the pattern match for the sequence of recently generated output tokens:

determining a sequence of speculative tokens based on the pattern match;

determining whether a confidence score of the sequence of speculative tokens satisfies a threshold score condition, the confidence score estimating a likelihood that the sequence of speculative tokens is correctly speculated;

based on the confidence score satisfying the threshold score condition, using a primary language model to verify the sequence of speculative tokens; and based on the primary language model successfully verifying the sequence of speculative tokens, adding the sequence of speculative tokens to a sequence of generated output tokens; and after the set of decoding iterations ends, generating an inference response to the inference request based on the sequence of generated output tokens.

30. The machine-storage medium of claim 29, wherein the confidence score satisfies the threshold score condition when the confidence score exceeds a threshold score value.

* * * * *